United States Patent
Nagamoto et al.

(10) Patent No.: US 12,368,337 B2
(45) Date of Patent: Jul. 22, 2025

(54) BRUSHLESS MOTOR AND BRUSHLESS MOTOR MANUFACTURING METHOD

(71) Applicant: MITSUBA Corporation, Gunma (JP)

(72) Inventors: Satoshi Nagamoto, Gunma (JP); Shingo Watanabe, Gunma (JP)

(73) Assignee: MITSUBA Corporation, Gunma (JP)

(*) Notice: Subject to any disclaimer, the term of this patent is extended or adjusted under 35 U.S.C. 154(b) by 114 days.

(21) Appl. No.: 18/024,771

(22) PCT Filed: Oct. 29, 2021

(86) PCT No.: PCT/JP2021/040094
§ 371 (c)(1),
(2) Date: Mar. 5, 2023

(87) PCT Pub. No.: WO2022/102440
PCT Pub. Date: May 19, 2022

(65) Prior Publication Data
US 2024/0283315 A1 Aug. 22, 2024

(30) Foreign Application Priority Data
Nov. 10, 2020 (JP) .................. 2020-186903

(51) Int. Cl.
*H02K 3/28* (2006.01)
*H02K 3/50* (2006.01)
*H02K 15/33* (2025.01)

(52) U.S. Cl.
CPC ............ *H02K 3/28* (2013.01); *H02K 3/50* (2013.01); *H02K 15/33* (2025.01)

(58) Field of Classification Search
CPC ............ H02K 3/28; H02K 3/50; H02K 15/33; H02K 21/22; H02K 3/522
See application file for complete search history.

(56) References Cited

U.S. PATENT DOCUMENTS

2009/0256438 A1* 10/2009 Ikeda .................. H02K 3/522
  310/71
2013/0038153 A1* 2/2013 Asahi .................. H02K 5/225
  310/71
2020/0052545 A1* 2/2020 Park .................... H02K 3/522

FOREIGN PATENT DOCUMENTS

JP    H0279760        3/1990
JP    2002233109      8/2002
(Continued)

OTHER PUBLICATIONS

"International Search Report (Form PCT/ISA/210) of PCT/JP2021/040094", mailed on Jan. 11, 2022, with English translation thereof, pp. 1-4.
(Continued)

*Primary Examiner* — Tulsidas C Patel
*Assistant Examiner* — Mohammed Ahmed Qureshi
(74) *Attorney, Agent, or Firm* — JCIPRNET

(57) ABSTRACT

A brushless motor includes a motor body, a bracket, and a power supply structure for supplying power to the motor body through a through hole in the bracket. The motor body includes a stator having a core with teeth and a coil formed of a winding wound around the teeth. The power supply structure includes, for each phase, a winding pair including a first lead portion and a second lead portion of the winding, a guide part that guides the winding pair, and a connector part where the lead portions are electrically connected. The winding pair includes a first portion guided by the ide part and a second portion formed by bending the winding pair at an axially outer end of the first portion along a surface of the bracket. The first portion passes through the through hole in the axial direction. The second portion extends to the connector part.

13 Claims, 28 Drawing Sheets

(56) References Cited

FOREIGN PATENT DOCUMENTS

| | | |
|---|---|---|
| JP | 2008193889 | 8/2008 |
| JP | 2009261098 | 11/2009 |
| JP | 2013038949 | 2/2013 |
| WO | 2013069127 | 5/2013 |
| WO | 2016129287 | 8/2016 |
| WO | 2018180641 | 10/2018 |

OTHER PUBLICATIONS

"Notice of Reasons for Refusal of Japan Counterpart Application", issued on Mar. 5, 2025, with English translation thereof, p. 1-p. 12.

* cited by examiner

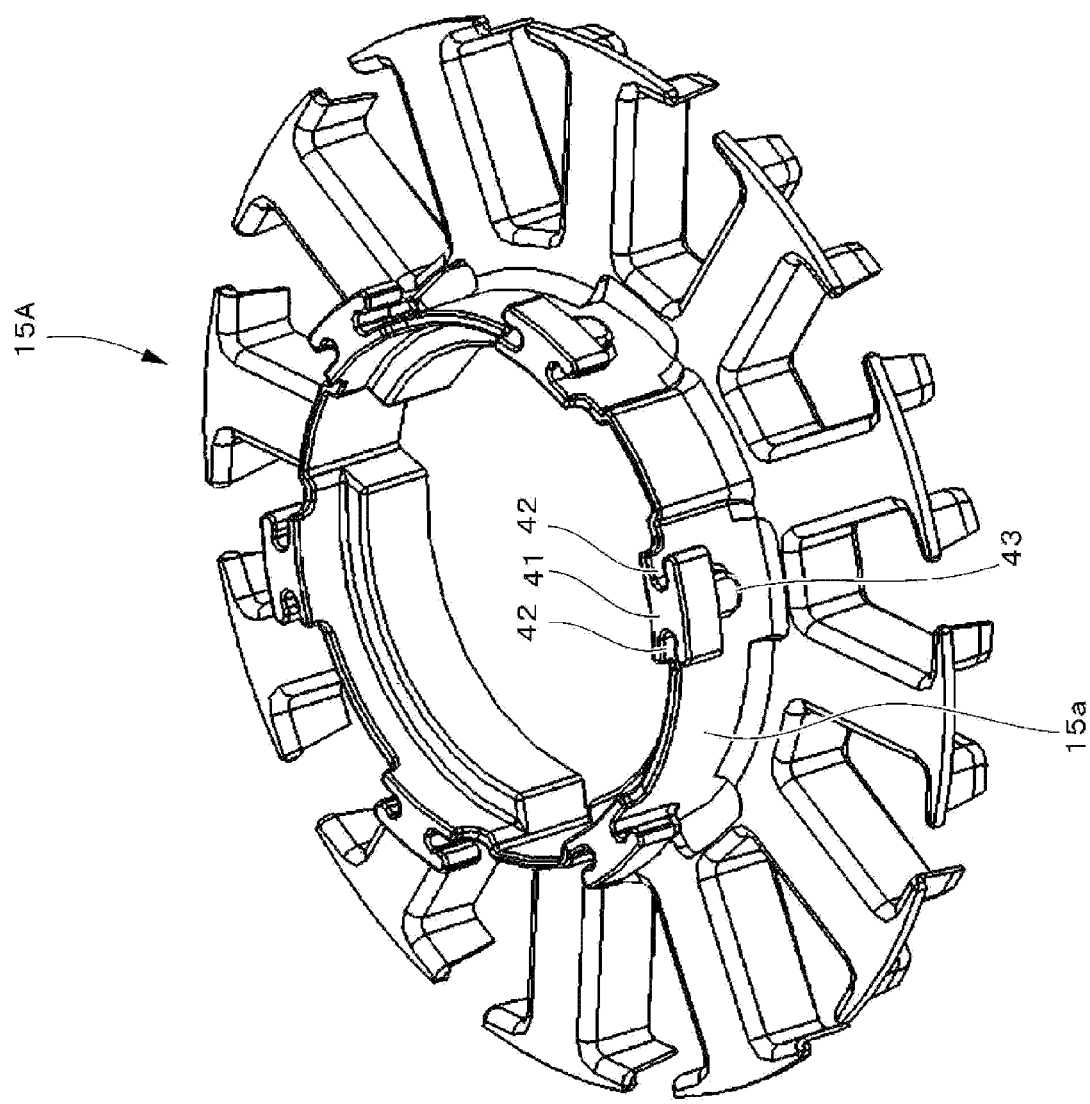

BRUSHLESS MOTOR AND BRUSHLESS MOTOR MANUFACTURING METHOD

CROSS-REFERENCE TO RELATED APPLICATION

This application is a 371 application of the international PCT application serial no. PCT/JP2021/040094, filed on Oct. 29, 2021, which claims the priority benefits of Japan application no. 2020-186903 filed on Nov. 10, 2020. The entirety of each of the above-mentioned patent applications is hereby incorporated by reference herein and made a part of this specification.

TECHNICAL FIELD

The present disclosure relates to a brushless motor and a method for manufacturing the brushless motor.

BACKGROUND ART

Patent document 1 discloses a brushless motor having a structure in which windings of a stator coil are connected to a drive circuit through insertion holes formed in a center piece.

PRIOR ART DOCUMENT

Patent Document

Patent Document 1: Japanese Unexamined Patent Publication No. 2008-193889

SUMMARY OF THE INVENTION

Problems to be Solved by the Invention

The above-mentioned conventional brushless motor requires twelve windings to be formed and then led to the drive circuit side through twelve insertion holes formed in the center piece, respectively. Therefore, the assembly is complicated and takes man-hours. In addition, there is another problem: connection points to the drive circuit are distributed over a wide area, and a complex configuration is required to connect the windings to the drive circuit.

It is therefore an object of the present disclosure to provide a brushless motor in which a winding of a stator coil can be easily connected to an external circuit and which does not require a complex configuration.

Means for Solving the Problems

In one aspect of the present disclosure, to achieve the object mentioned above, there is provided a brushless motor including: a motor body; a bracket to which the motor body is attached; and a power supply structure configured to supply power to the motor body through a through hole formed in the bracket. The bracket is arranged to cover an axial end face of the motor body. The motor body includes a stator. The stator includes a stator core having a plurality of teeth and a stator coil formed of a winding wound around the teeth. With respect to each phase, the power supply structure includes: a winding pair including a first lead portion of the winding and a second lead portion of the winding; a guide part that guides the winding pair; and a connector part to which the first lead portion and the second lead portion are electrically connected. The winding pair includes: a first portion guided by the guide part; and a second portion formed by bending the winding pair at an axially outer end of the first portion in a direction along a surface of the bracket. The first portion passes through the through hole in an axial direction, and the second portion extends to the connector part.

Effects of the Invention

According to one aspect of the present disclosure, it is possible to provide a brushless motor in which a winding of a stator coil can be easily connected to an external circuit and which does not require a complex configuration.

BRIEF DESCRIPTION OF THE DRAWINGS

FIG. 6B is a perspective view of an insulator.

MODES FOR CARRYING OUT THE INVENTION

In the following, exemplary embodiments will be described in detail with reference to the accompanying drawings.

First Embodiment

Figure 1:
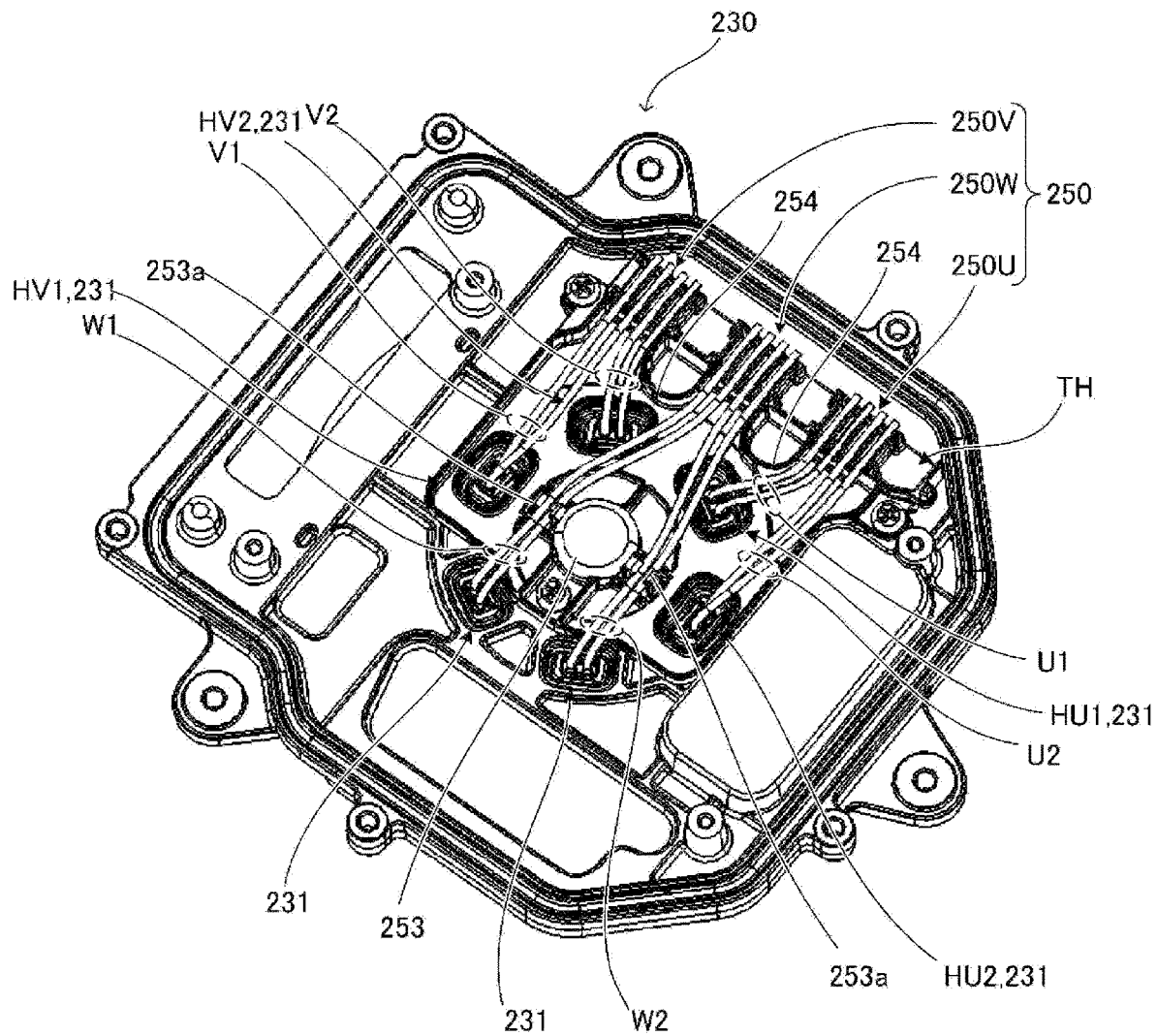
FIG. 1 is a perspective view of a brushless motor according to a first embodiment.
Figure 1A:
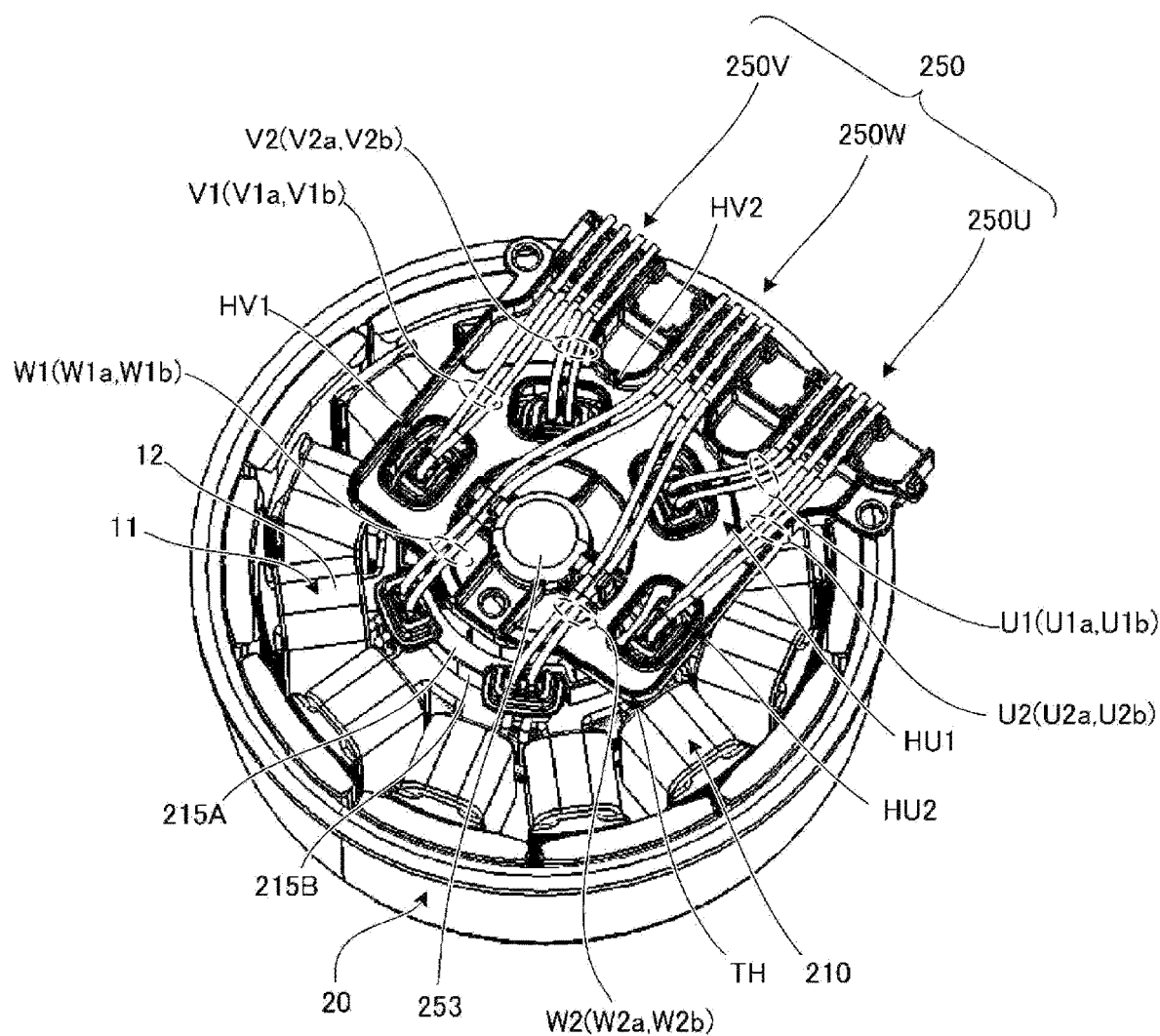
FIG. 1A is a perspective view of the brushless motor where a bracket is removed.
Figure 1B:
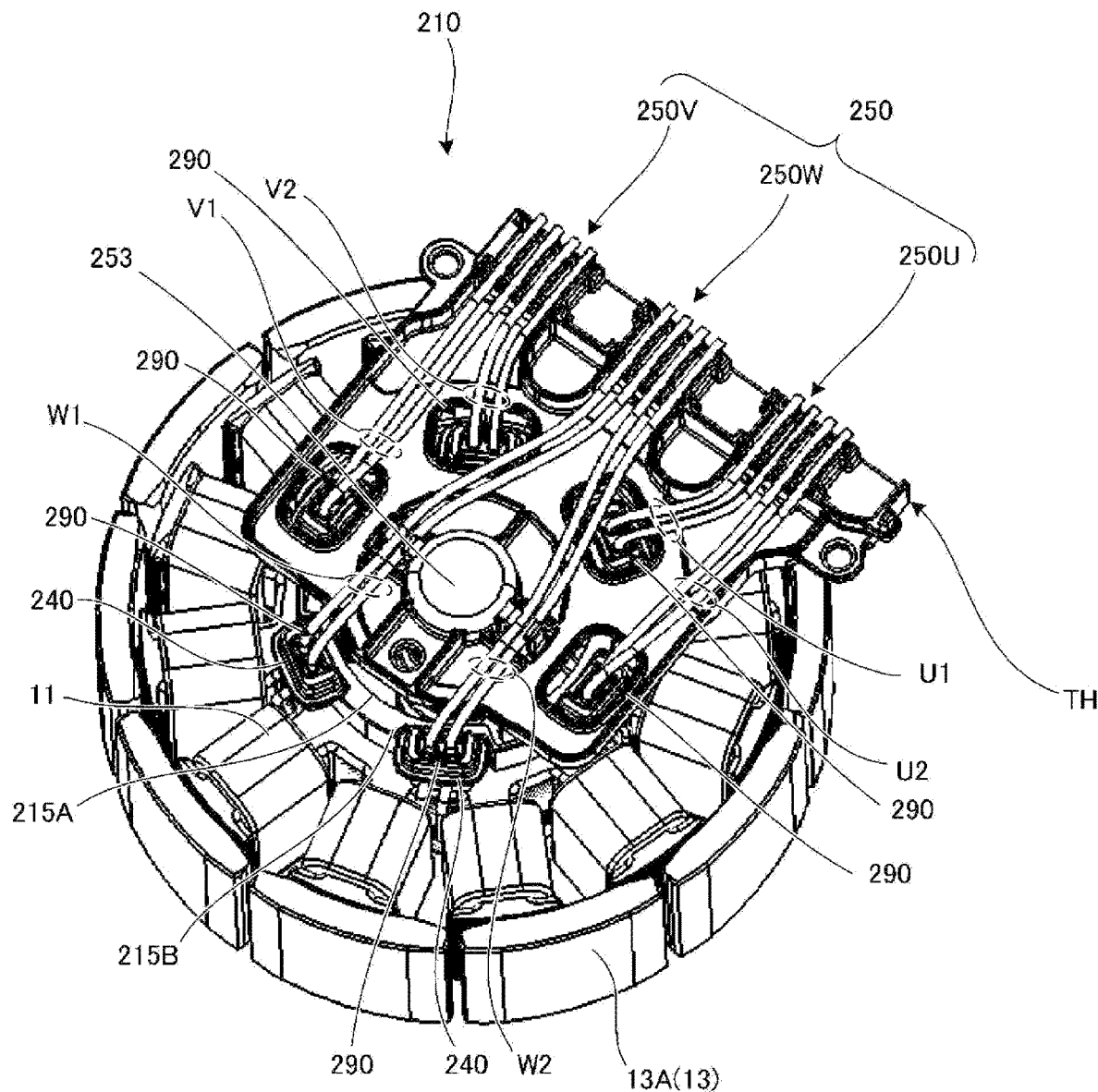
FIG. 1B is a perspective view illustrating the configuration of a power supply structure and a stator.
Figure 1C:
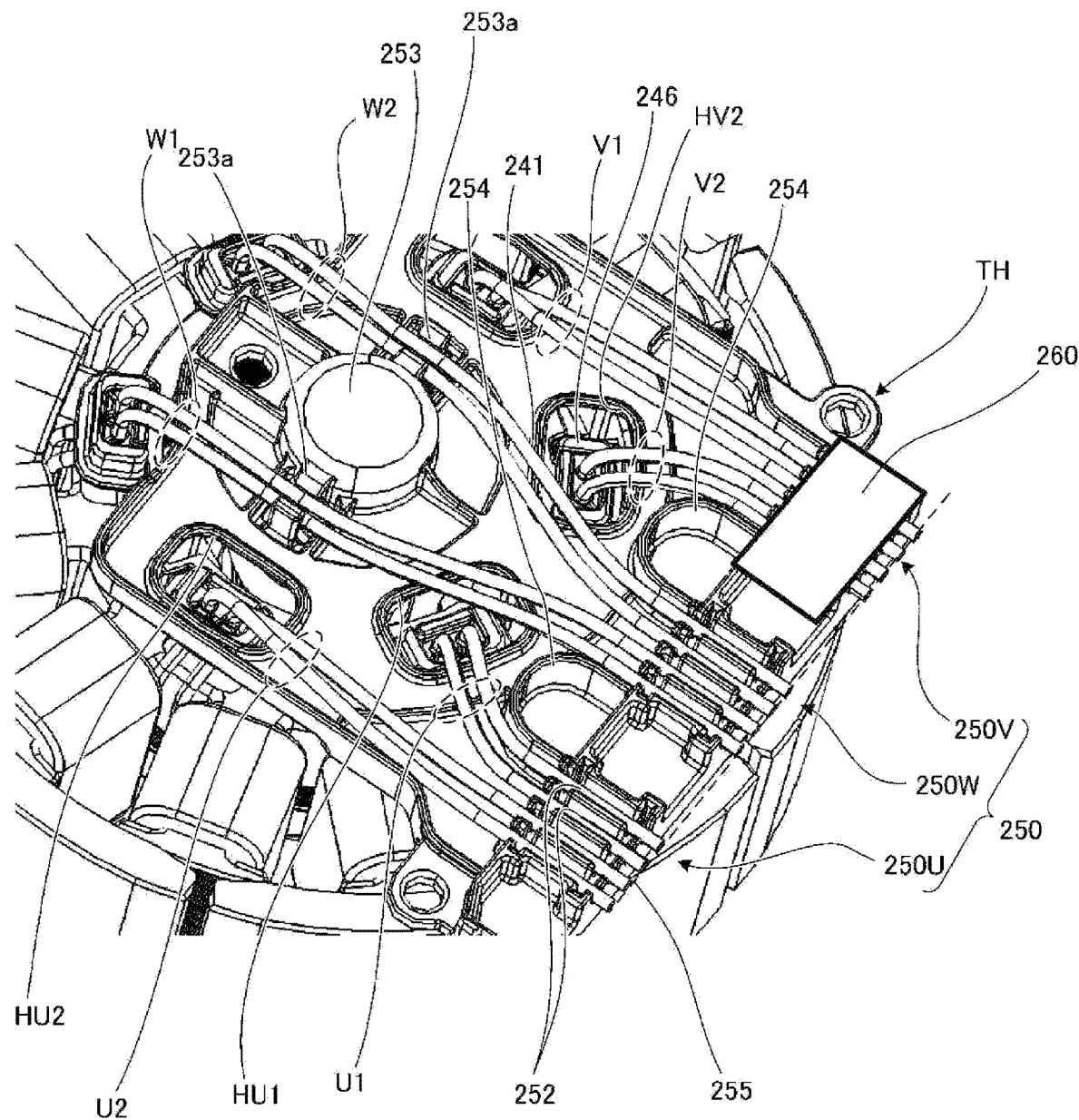
FIG. 1C is a perspective view illustrating the vicinity of the power supply structure.
Figure 2:
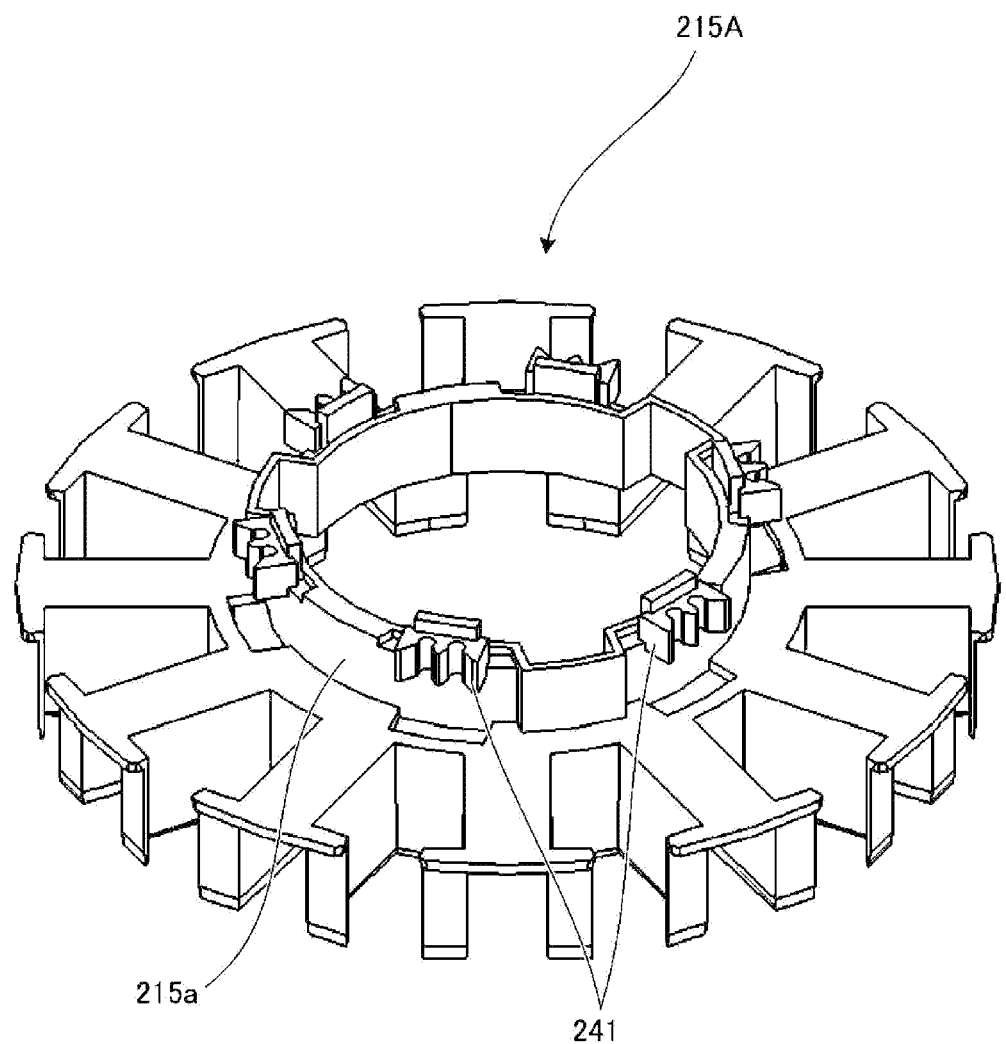
FIG. 2 is a perspective view of an insulator.
Figure 2A:
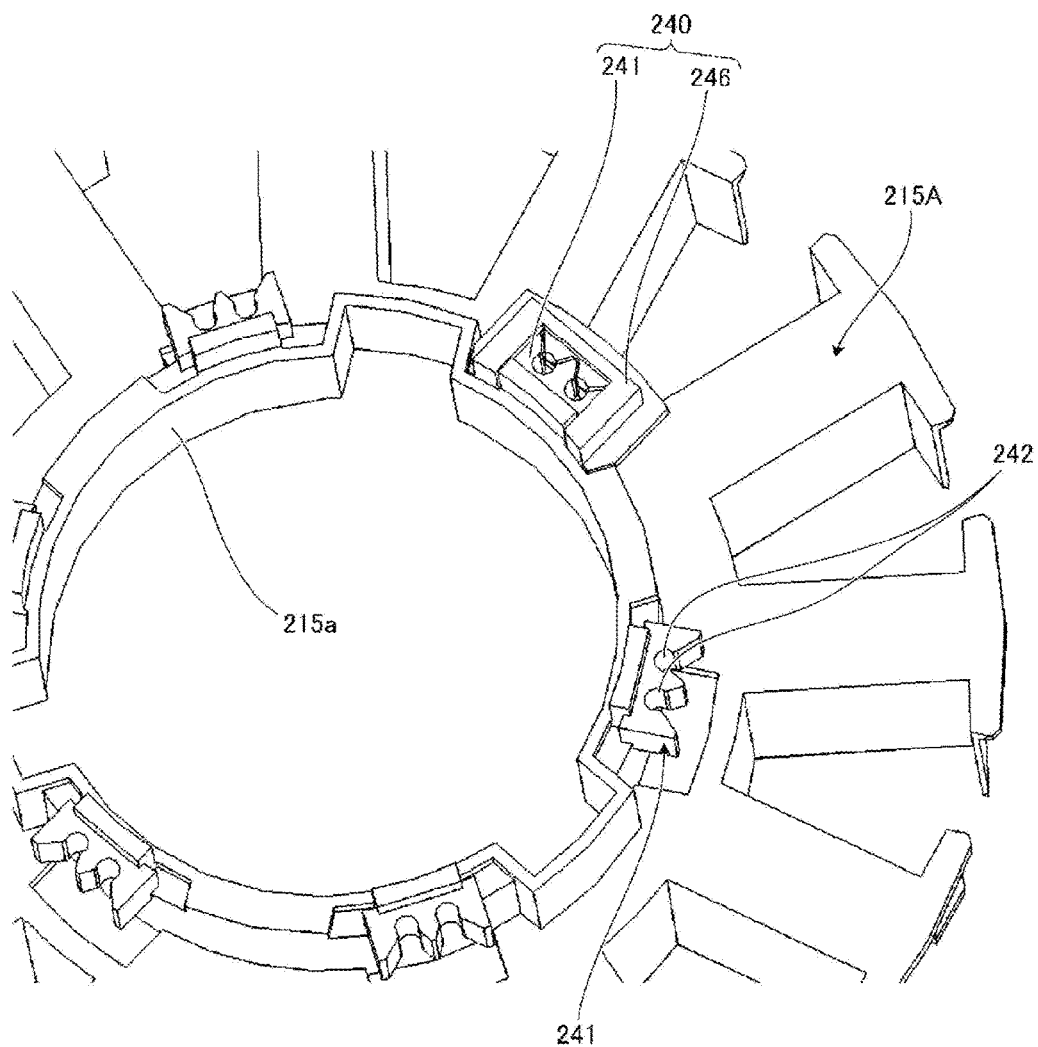
FIG. 2A is a perspective view illustrating the configuration of a guide part.
Figure 2B:
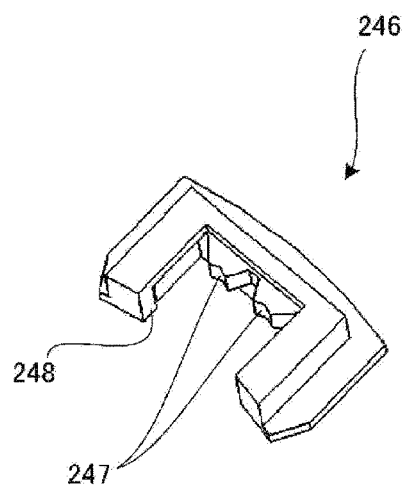
FIG. 2B is a perspective view of a cap member.
Figure 2C:
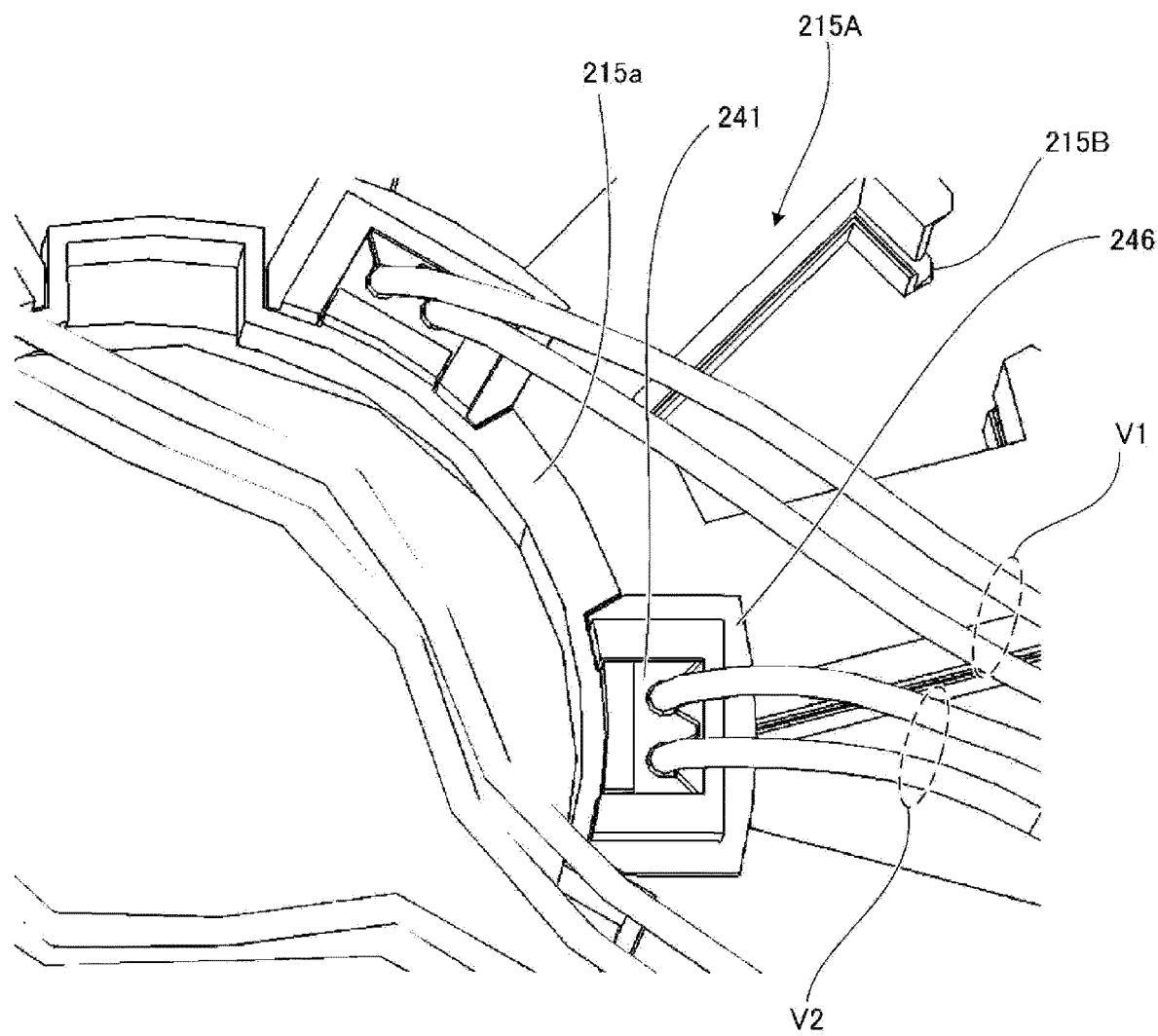
FIG. 2C is a perspective view illustrating a state of a winding supported by the guide part.
Figure 2D:
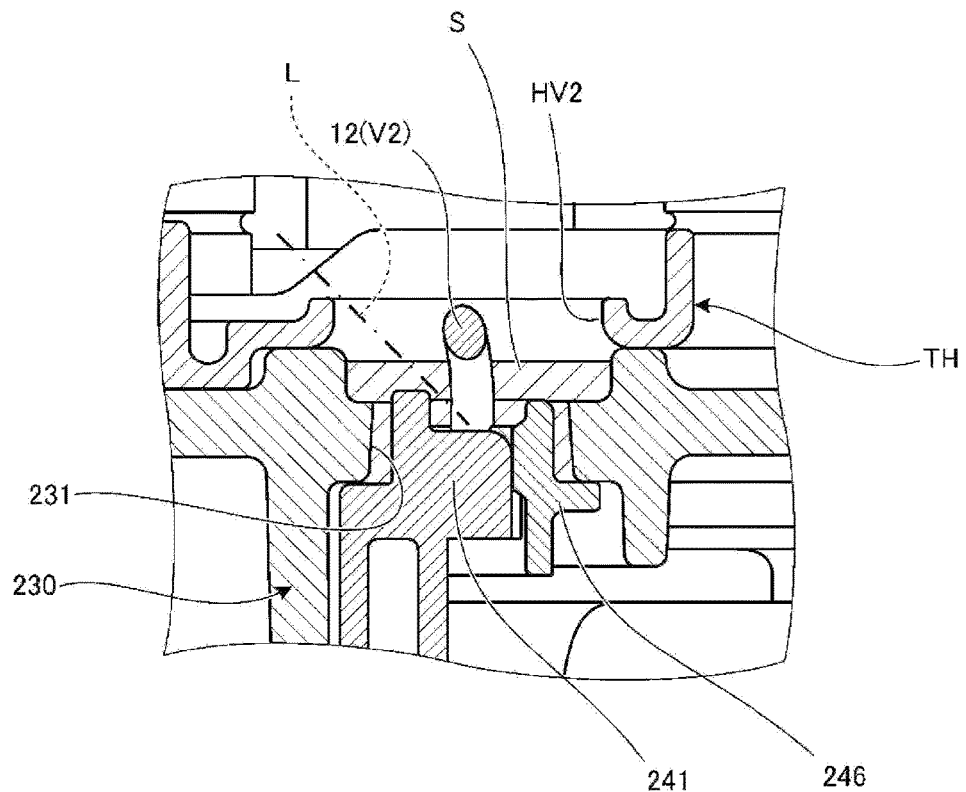
FIG. 2D is a cross-sectional view illustrating a configuration around the guide part.

FIG. 1 is a perspective view of a brushless motor. FIG. 1A is a perspective view of the brushless motor where a bracket is removed. FIG. 1B is a perspective view illustrating the configuration of a power supply structure and a stator. FIG. 1C is a perspective view illustrating the vicinity of the power supply structure. FIG. 2 is a perspective view of an insulator. FIG. 2A is a perspective view illustrating the configuration of a guide part. FIG. 2B is a perspective view of a cap member. FIG. 2C is a perspective view illustrating a state of a winding supported by the guide part. FIG. 2D is a cross-sectional view illustrating a configuration around the guide part. For the convenience of description, some of the constituent elements illustrated in FIG. 1 are omitted in FIGS. 1A to 2D. Note also that, in the following description, the circumferential direction, the axial direction, and the radial direction are defined with respect to the axis of the rotary shaft.

The brushless motor of this embodiment is a three-phase motor. For example, the brushless motor may be used, but not limited to, as part of a device that drives a fan unit F (see FIG. 4).

As illustrated in FIGS. 1 to 1i, the brushless motor of the embodiment has a motor body that includes a stator 210 with a plurality of (12 in this embodiment) coils 11 arranged in the circumferential direction and a rotor 20 located on the outer circumferential side of the stator 210.

The stator 210 includes a stator core 13, which is made of steel plates stacked in the axial direction and has a plurality of (12 in this embodiment) teeth 13A projecting outward in the circumferential direction. A winding 12 is wound around each of the teeth 13A of the stator core 13 to form the coils 11. The coils 11 each constitute a stator coil for each phase.

As illustrated in FIG. 1B, an insulator member 215A and an insulator member 215B are interposed between the winding 12 and the stator core 13 to insulate the winding 12 and the stator core 13 from each other. The insulator member 215A extends further than the coils 11 to the inner circumferential side and has a cylindrical inner circumferential portion 215a (FIGS. 2, 2A, and 2C).

Figure 6:
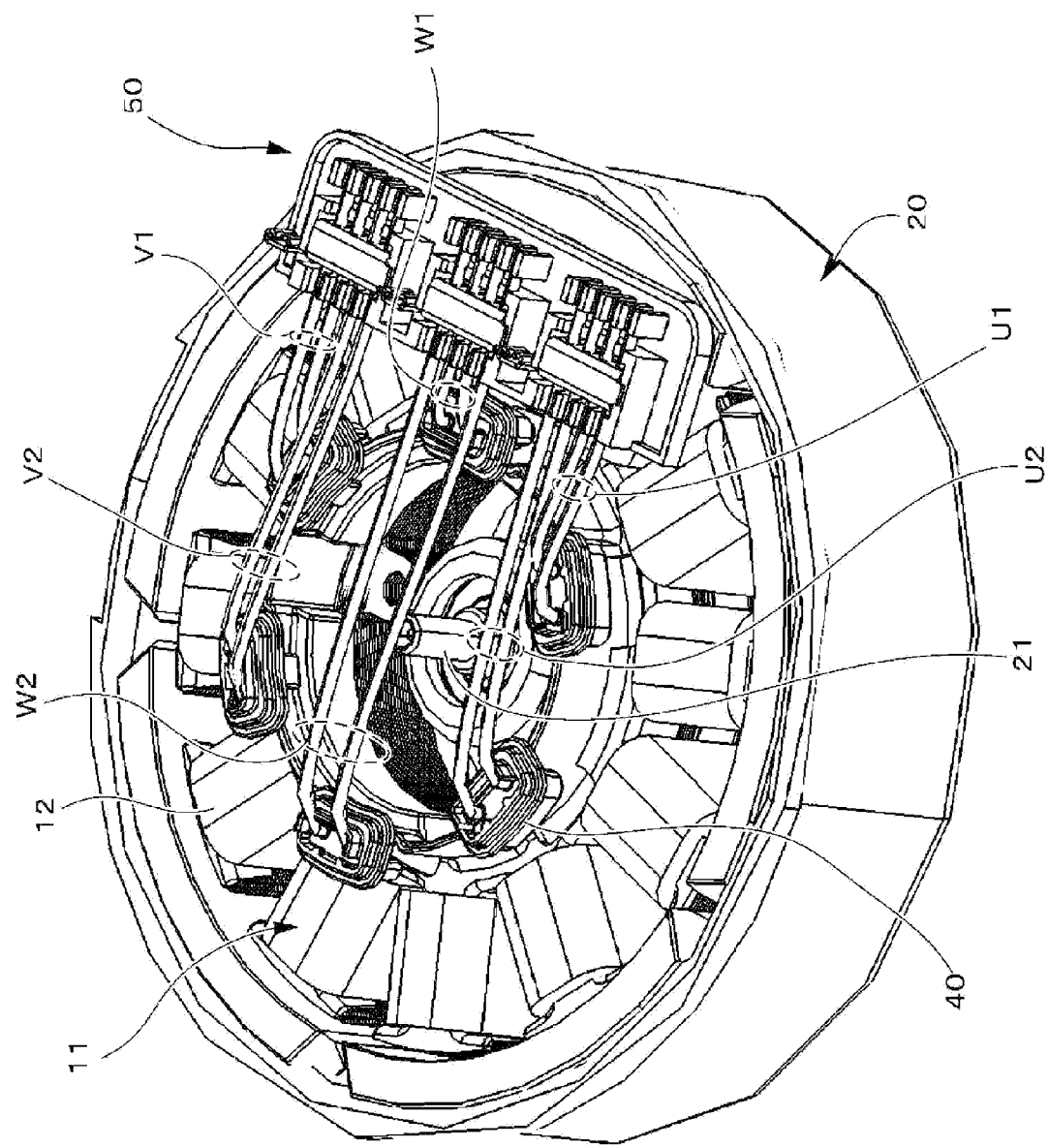
FIG. 6 is a perspective view of the brushless motor where a bracket is removed.

The rotor 20 is rotatably supported about a rotary shaft 21 (see FIG. 6). The fan unit F (see FIG. 4) is attached to the rotor 20. As illustrated in FIG. 1A, the brushless motor of the embodiment is configured as an outer-rotor motor in which the rotor 20 is located on the outer circumferential side of the stator 210. The stator 210 is fixed to an aluminum bracket 230 (FIG. 1), which is arranged to cover the axial end face of the motor body (the stator 210 and the rotor 20). The rotor 20 is also attached to the bracket 230 so as to be rotatable about the rotary shaft 21.

The bracket 230 is provided with six through holes 231 (FIG. 1), which are spaced at equal angles (60°) around the axis. Through the through holes 231, the winding 12 drawn out from the coils 11 passes through the bracket 230 in the axial direction.

Referring further to FIG. 1, a resin terminal holder TH is provided on the front side of the bracket 230, and it is fastened to the bracket 230. The terminal holder TH has through holes HV1, HV2, HU1, and HU2 (FIG. 1A) facing four of the six through holes 231 and includes a portion that constitutes a connector part 250 (described later). The terminal holder TH has the function of preventing contact between the winding 12 and the bracket 230 to ensure the insulation of the winding 12, and the like.

The brushless motor of the embodiment includes six guide parts 240 and the connector part 250 as a power supply structure.

The six guide parts 240 are spaced at equal angles (60°) around the axis so as to correspond to the through holes 231 of the bracket 230 (see FIG. 1B). The guide parts 240 are provided to guide the winding 12 such that the winding 12 is drawn out through the through holes 231 while ensuring the insulation between the winding 12 and the bracket 230. The winding 12 passes through the through holes 231 in the axial direction near a portion (an example of a first portion) guided by each of the guide parts 240.

As illustrated in FIG. 1A, one of the guide parts 240 guides or supports a winding pair U1 including a lead portion U1a (an example of a first lead portion) of the winding 12 drawn from one of the coils 11 and a lead portion U1b (an example of a second lead portion) of the winding 12 drawn from another one of the coils 11. The winding pair U1 passes through a corresponding one of the through holes 231 and the through hole HU1 in the axial direction.

Similarly, one of the guide parts 240 guides or supports a winding pair U2 including a lead portion U2a of the winding 12 drawn from one of the coils 11 and a lead portion U2b of the winding 12 drawn from another one of the coils 11. The winding pair U2 passes through a corresponding one of the through holes 231 and the through hole HU2 in the axial direction.

Similarly, one of the guide parts 240 guides or supports a winding pair V1 including a lead portion V1a of the winding 12 drawn from one of the coils 11 and a lead portion V1b of the winding 12 drawn from another one of the coils 11. Another one of the guide parts 240 guides or supports a winding pair V2 including a lead portion V2a of the winding 12 drawn from one of the coils 11 and a lead portion V2b of the winding 12 drawn from another one of the coils 11. The winding pair V1 passes through a corresponding one of the through holes 231 and the through hole HV1 in the axial direction. The winding pair V2 passes through a corresponding one of the through holes 231 and the through hole HV2 in the axial direction.

Similarly, one of the guide parts 240 guides or supports a winding pair W1 including a lead portion W1a of the winding 12 drawn from one of the coils 11 and a lead portion W1b of the winding 12 drawn from another one of the coils 11. Another one of the guide parts 240 guides or supports a winding pair W2 including a lead portion W2a of the winding 12 drawn from one of the coils 11 and a lead portion W2b of the winding 12 drawn from another one of the coils 11. The winding pairs W1 and W2 each pass through a corresponding one of the through holes 231 in the axial direction.

As will be described below, the winding pairs U1 and U2, the winding pairs V1 and V2, and the winding pairs W1 and W2 correspond to three phases (U, V, W), respectively, and the winding pairs for each phase are connected to each other at the connector part 250.

The guide parts 240 each include a support member 241 (FIGS. 2, 2A, and 2C) that supports or guides the winding 12 and a cap member 246 (FIGS. 2A, 2B, and 2C) that is fitted to the support member 241. Incidentally, FIG. 2A illustrates the cap member 246 fitted to the support member 241 in only one of the guide parts 240.

As illustrated in FIG. 2, the support member 241 is configured as part of the insulator member 215A and protrudes from the outer circumferential surface of the inner circumferential portion 215a.

As illustrated in FIG. 2A, the support member 241 has two recesses 242 for receiving the winding 12 in the axial direction. The recesses 242 are open in the circumferential direction, and the winding 12 can be inserted through the opening. As illustrated in FIG. 2B, the cap member 246 is formed in a U-shape as viewed in the axial direction and can be fitted to the support member 241 from the outer circumferential side. The cap member 246 has two projections 247 projecting inward and two claws 248 projecting in the circumferential direction (only one of which is illustrated in FIG. 2B). After the winding 12 is inserted in the recesses 242, the cap member 246 is fitted to the support member 241 from the outer circumferential side and thereby fixed. In this state, the winding 12 housed in the recesses 242 is supported while being pressed by the projections 247 from the outer circumferential side. In addition, the claws 248 of the cap member 246 engage the support member 241, which prevents the cap member 246 from shifting to the outer circumferential side and coming off the support member 241.

As illustrated in FIG. 2C, the winding 12 (the first lead portion or the second lead portion) drawn out from each of the coils 11 in the circumferential direction is drawn to a predetermined position along the inner circumferential portion 215a of the insulator member 215A. The winding 12 is then led as the winding pairs U1, U2, V1, V2, W1, and W2 to the respective guide parts 240, as described above.

During assembly, the winding 12 is drawn along the inner circumferential portion 215a of the insulator member 215A to the corresponding support member 241. The winding 12 is then bent along the recesses 242 of the corresponding support member 241, whereby the winding 12 drawn along the inner circumferential portion 215a of the insulator member 215A can be easily inserted into the recesses 242.

In this embodiment, each support member 241 is provided with two recesses 242. Since the recesses 242 are open in the circumferential direction, the winding pairs U1, U2, V1, V2, W1, and W2 can be easily set in the recesses 242. Additionally, the winding pairs U1, U2, V1, V2, W1, and W2 can be easily fixed by simply fitting the cap member 246 to the support member 241 from the outer circumferential side.

In addition, when the cap member 246 is fitted to the support member 241, a gap is formed between the cap member 246 and the support member 241. The gap has a cross-sectional shape substantially identical to that of the winding 12, and the winding 12 is housed in this gap, so that a gap between the winding 12 and each of the guide parts 240 (the support member 241 and the cap member 246) is very small. As a result, the through holes 231 are substantially closed by the winding 12 passing through the guide parts 240 and the recesses 242. Thus, it is possible to prevent a sealant S (FIG. 2D) for closing the through holes 231 from leaking through the through holes 231. The sealant S is applied to an area that includes the support member 241, the cap member 246, and the winding 12 as viewed in the axial direction. Since the through holes 231 are closed by the sealant S in this manner, the brushless motor of the embodiment can be applied to cases where airtightness and waterproofness are required. Furthermore, the sealant S causes the guide parts 240 to adhere to the bracket 230, thereby eliminating the possibility of unexpected movement of the guide parts 240.

As illustrated in FIG. 2D, the brushless motor of the embodiment is configured such that a tangent line L to the surfaces of the support member 241 and the terminal holder TH in the cross-sectional view does not contact the bracket 230. Although FIG. 2D illustrates only a portion corresponding to the winding pair V2, a tangent line to the surfaces of the support member 241 and the terminal holder TH does not contact the bracket 230 with respect to all the winding pairs U1, U2, V1, V2, W1, and W2. This prevents contact between the bracket 230 and the winding pairs U1, U2, V1, V2, W1, and W2, thus reliably ensuring the electrical insulation of the winding 12.

Figure 1D:
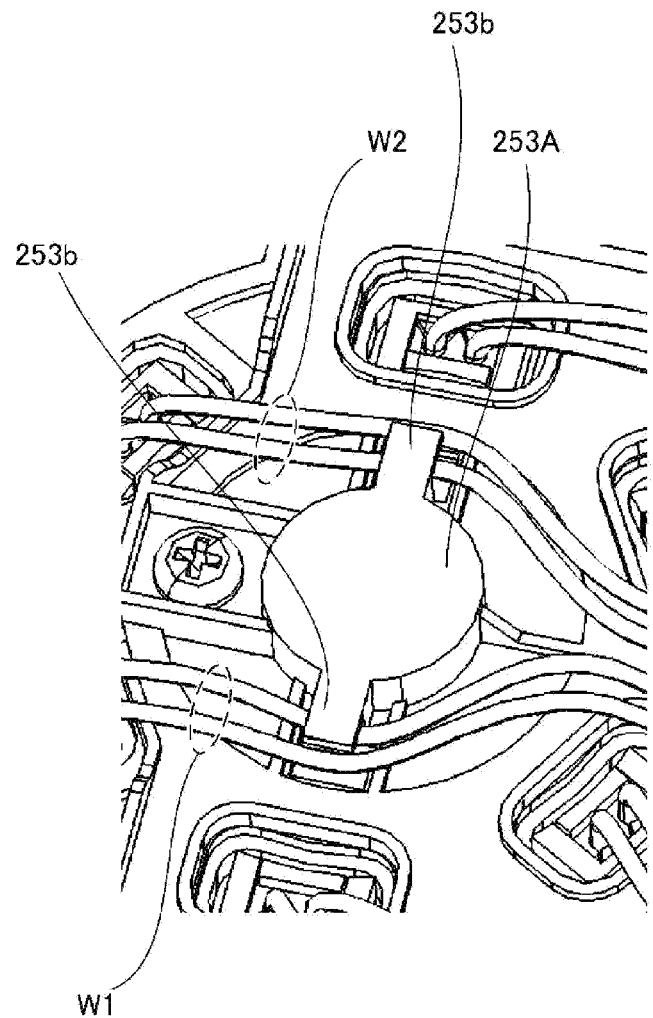
FIG. 1D is a perspective view illustrating the form of another guide.

The terminal holder TH is provided with two guides 253a extending toward the outer circumference from a cylindrical convex portion 253 that houses the rotary shaft 21. As illustrated in FIG. 1C, the guides 253a can be used to secure the winding pairs W1 and W2 passing through the guide parts 240 and the through holes 231 and to arrange each of them along a predetermined path that does not interfere with other portions of the winding 12. The terminal holder TH is also provided with two guides 254 located near the connector part 250. The guides 254 each have an arcuate outer surface as viewed in the axial direction. The guides 254 have the function of guiding the winding pairs U1, U2, V1, V2, W1, and W2 passing through the through holes 231 to appropriate positions leading to their respective connector parts 250U, 250V, and 250W. As illustrated in FIG. 1D, in place of the guides 253a, the terminal holder TH may be provided with two guides 253b projecting toward the outer circumference from a cylindrical convex portion 253A that houses the rotary shaft 21. In this case, the guides 253b can be used to regulate the positions of the winding pairs W1 and W2 such that the winding pairs W1 and W2 are each arranged along a predetermined path that does not interfere with other portions of the winding 12.

Figure 3:
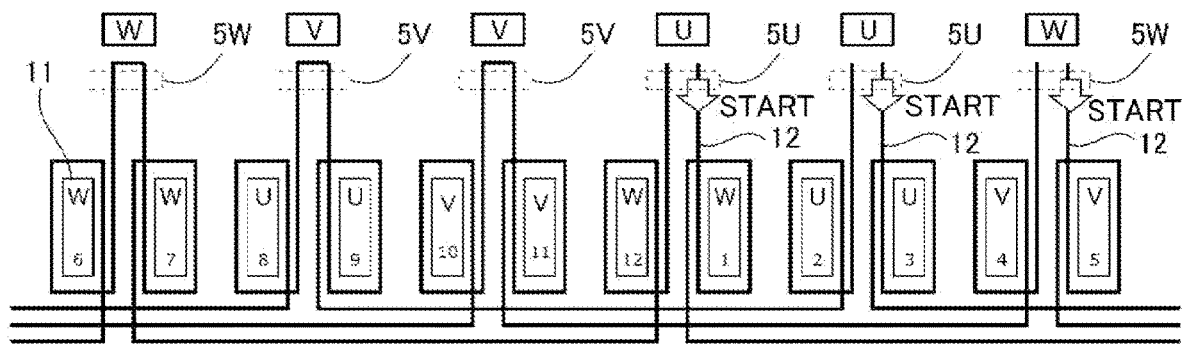
FIG. 3 is a diagram illustrating a connection relationship of the winding of coils.
Figure 3A:
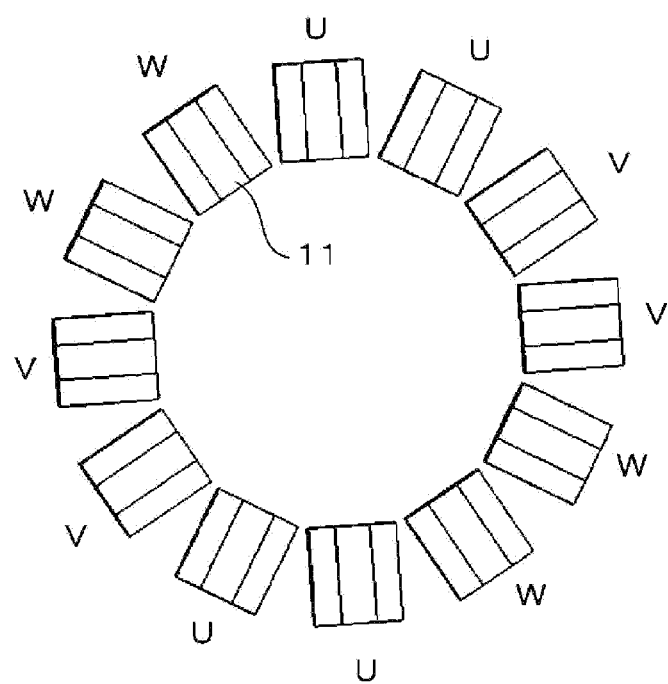
FIG. 3A is a diagram illustrating phases assigned to the coils as viewed in the axial direction.
Figure 3B:
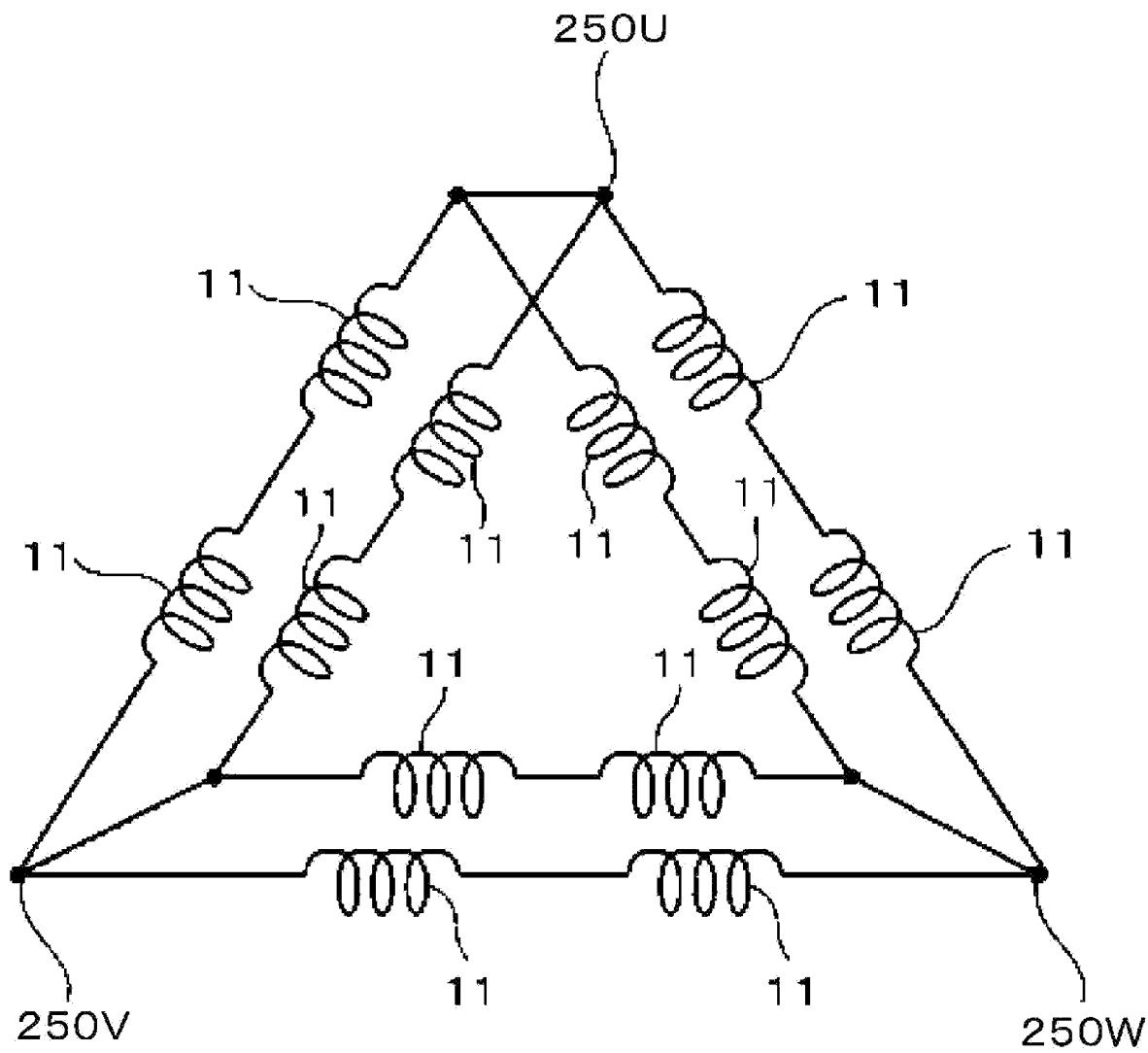
FIG. 3B is a diagram illustrating the connection state (delta connection) of the coils.

FIG. 3 is a diagram illustrating a connection relationship of the winding of the coils. FIG. 3A is a diagram illustrating the phases assigned to the coils as viewed in the axial direction. FIG. 3B is a diagram illustrating the connection state (delta connection) of the coils. The order of the coils illustrated in FIG. 3 corresponds to the order in which they are arranged in the circumferential direction.

In FIGS. 3 to 3B, the letters U, V, and W refer to the three phases U, V and W, respectively.

In the state illustrated in FIG. 3, the winding 12 is connected in a delta connection (FIG. 3B) using four coils 11 per phase, where two pairs of series-connected coils 11 are drawn to the connector parts 250U, 250V, 250W so as to be connected in parallel. In FIG. 3, connection points 5U, 5V, and 5W, each connected with two windings 12, correspond to the connector parts 250U, 250V, and 250W, respectively. Meanwhile, the winding pairs (the two windings 12) connected to the connection points 5U, 5V, and 5W correspond to the winding pairs U1 and U2, the winding pairs V1 and V2, and the winding pairs W1 and W2 connected to the connector parts 250U, 250V, and 250W, respectively.

FIG. 3 illustrates the direction in which the winding 12 is wound in each of the coils 11 (the clockwise direction and the counterclockwise direction when the coils 11 are viewed in the radial direction from the axial center). In FIG. 3, "START" indicates a starting point for winding the winding 12.

As illustrated in FIG. 3A, the four coils 11 for each of the phases U, V, and W are arranged such that the phases U, V, and W are rotationally symmetric about the axis of rotation. Incidentally, the letters U, V and W given to the coils 11 in FIG. 3 correspond to the letters U, V and W given to the coils 11 in FIG. 3A.

Next, the configuration of the connector part 250 will be described.

As illustrated in FIG. 1C, the connector part 250 includes the connector part 250U corresponding to the U-phase, the connector part 250V corresponding to the V-phase, and the connector part 250W corresponding to the W-phase. The connector parts 250U, 250V, and 250W are arranged linearly in a position offset from the axial center.

The connector parts 250U, 250V, and 250W each include a terminal 260 (FIG. 1C) having a slit (not illustrated) to which the winding pairs U1 and U2, the winding pairs V1 and V2, or the winding pairs W1 and W2 are press-fitted. The connector parts 250U, 250V, and 250W further include the above-mentioned insulating terminal holder TH that holds the terminal 260.

As illustrated in FIG. 1C, the connector parts 250U, 250V, and 250W each have four groove-shaped guides 252 that guide the winding pairs U1 and U2, the winding pairs V1 and V2, or the winding pairs W1 and W2. The tip portions of the winding pairs U1 and U2, the winding pairs V1 and V2, and the winding pairs W1 and W2 are housed in the guides 252. Note that, in the illustration of FIG. 1C, the terminals 260 of the connector parts 250U and 250W are removed to show the configuration of the terminal holder TH. Additionally, FIG. 1C illustrates the guides 252 only for the connector part 250U.

A portion of the terminal holder TH that constitutes the connector part 250 has an uneven shape corresponding to the shape of the terminal 260, so that the terminal 260 is stably fixed to the terminal holder TH when inserted therein. In addition, when the winding pairs U1 and U2, the winding pairs V1 and V2, and the winding pairs W1 and W2 housed in the guides 252 are press-fitted to their corresponding terminals 260, the terminals 260 scrape off the insulation coating of the winding 12 and are pressed against the scraped winding 12 to be electrically connected to the winding 12. This allows four windings 12 to be connected at one time without welding, simplifying the manufacturing process. It is also possible to ensure reliable conduction between the winding pairs U1 and U2, the winding pairs V1 and V2, and the winding pairs W1 and W2 and their corresponding terminals 260. Furthermore, the winding pairs U1 and U2, the winding pairs V1 and V2, and the winding pairs W1 and W2 can be connected to their corresponding terminals 260 without using fusing, projection welding, or the like as a joining process in the connector part 250.

Described below is the process of connecting the winding pairs U1 and U2, the winding pairs V1 and V2, and the winding pairs W1 and W2 to the connector parts 250U, 250V, and 250W, respectively.

The winding pairs U1 and U2, the winding pairs V1 and V2, and the winding pairs W1 and W2 supported by the guide parts 240 and passing through the through holes 231 (and the through holes HU1, HU2 and HV1, HV2 in the case of the winding pairs U1, U2 and V1, V2) in the axial direction are each bent about 90° at a bent portion 290 at the axially outer end (FIG. 1B, an example of an axially outer end). As a result, the tip portions of the winding pairs U1 and U2, the winding pairs V1 and V2, and the winding pairs W1 and W2 reach the connector parts 250U, 250V, and 250W, respectively. The tip portions of the winding pairs U1 and U2, the winding pairs V1 and V2, and the winding pairs W1 and W2 are then inserted into the corresponding guides 252 and are thereby held while being housed in the guides 252.

The lengths of the winding pairs U1 and U2, the winding pairs V1 and V2, and the winding pairs W1 and W2 may be set so that the tip portions thereof reach the connector part 250 with less excess length. Specifically, the length of a portion (an example of a second portion) of a winding pair (U1, U2, V1, V2, W1, W2) from a corresponding one of the guide parts 240 to a connector part (250U, 250V, 250W) corresponds to the distance from the corresponding one of the guide parts 240 to the connector part (250U, 250V, 250W). That is, the length of the second portion varies depending on the distance from the guide part 240 corresponding to each winding pair to the connector part (250U, 250V, 250W). In addition, the second portion of each winding pair (U1, U2, V1, V2, W1, W2) has the same length in the lead portion U1a, U2a, V1a, V2a, W1a, or W2a and the lead portion U1b, U2b, V1b, V2b, W1b, or W2b. Accordingly, the winding pairs U1 and U2, the winding pairs V1 and V2, and the winding pairs W1 and W2 are each arranged substantially linearly. This eliminates the risk of connecting the winding pairs U1 and U2, the winding pairs V1 and V2, and the winding pairs W1 and W2 to the wrong connector parts 250U, 250V, and 250W.

Next, the terminals 260 are fitted to the terminal holder TH at the connector parts 250U, 250V, and 250W. Thereby, the winding pairs U1 and U2, the winding pairs V1 and V2, and the winding pairs W1 and W2 are press-fitted to the slits of their corresponding terminals 260. At this time, the edges of the slits of the terminals 260 scrape off the insulation coating of the winding pairs U1 and U2, the winding pairs V1 and V2, and the winding pairs W1 and W2, thus ensuring conduction between the conductors of the winding pairs U1 and U2, the winding pairs V1 and V2, and the winding pairs W1 and W2 and their corresponding terminals 260. As a result, the winding pairs for the same phase, i.e., the winding pairs U1 and U2, the winding pairs V1 and V2, and the winding pairs W1 and W2, conduct each other.

After that, the tip portions of the winding pairs U1 and U2, the winding pairs V1 and V2, and the winding pairs W1 and W2 are cut along a straight line 255. This removes the unwanted tip portions of the winding pairs U1 and U2, the winding pairs V1 and V2, and the winding pairs W1 and W2. With the removal of the unwanted portions of the winding pairs U1 and U2, the winding pairs V1 and V2, and the winding pairs W1 and W2, the weight and size of the brushless motor can be reduced. Incidentally, there may be looped winding pairs as illustrated in FIG. 3. For example, in the case of the winding pairs V1 and V2, they may be connected to the connector part 250V in the looped state, and then the end of the loop can be cut along the straight line 255 (see second embodiment).

Alternatively, for example, the tip portions of the winding pairs U1 and U2, the winding pairs V1 and V2, and the winding pairs W1 and W2 may be able to be housed in the holder terminal HT without being cut to eliminate the process of cutting the winding 12.

As illustrated in FIGS. 1 to 1C, the winding pairs U1 and U2, the winding pairs V1 and V2, and the winding pairs W1 and W2, i.e., winding pairs for different phases, do not cross one another as viewed in the axial direction. This prevents contact and conduction between winding pairs for different phases. In addition, the insulating terminal holder TH is interposed between the bracket 230 and the winding pairs U1 and U2, the winding pairs V1 and V2, and the winding pairs W1 and W2 over the entire area where the winding pairs U1 and U2, the winding pairs V1 and V2, and the winding pairs W1 and W2 overlap the bracket 230 in the axial direction. This prevents the winding pairs U1 and U2, the winding pairs V1 and V2, and the winding pairs W1 and W2 from coming into contact with the bracket 230, thus ensuring insulation.

According to the embodiment, the winding pairs U1 and U2, the winding pairs V1 and V2, and the winding pairs W1 and W2, which correspond to twelve leads of the winding 12 drawn from the coils 11, are bent in the same direction, and thereby the winding pairs for the three phases U, V, and W can be collectively connected to the connector parts 250U, 250V, and 250W, respectively. In other words, the twelve leads of the winding 12 are integrated into six pairs of windings, and the conduction between the leads of the winding 12 that constitute each pair of windings can be ensured without operational burden. This improves the work efficiency of connecting the winding 12 drawn from the coils 11 to the connector parts 250U, 250V, and 250W.

In addition, the twelve leads of the winding 12 are collectively connected to the three connector parts 250U, 250V, and 250W with respect to each phase, which facilitates the process of connecting the winding to a drive circuit. Furthermore, the connector part does not require a complex configuration.

Second Embodiment

Figure 4:
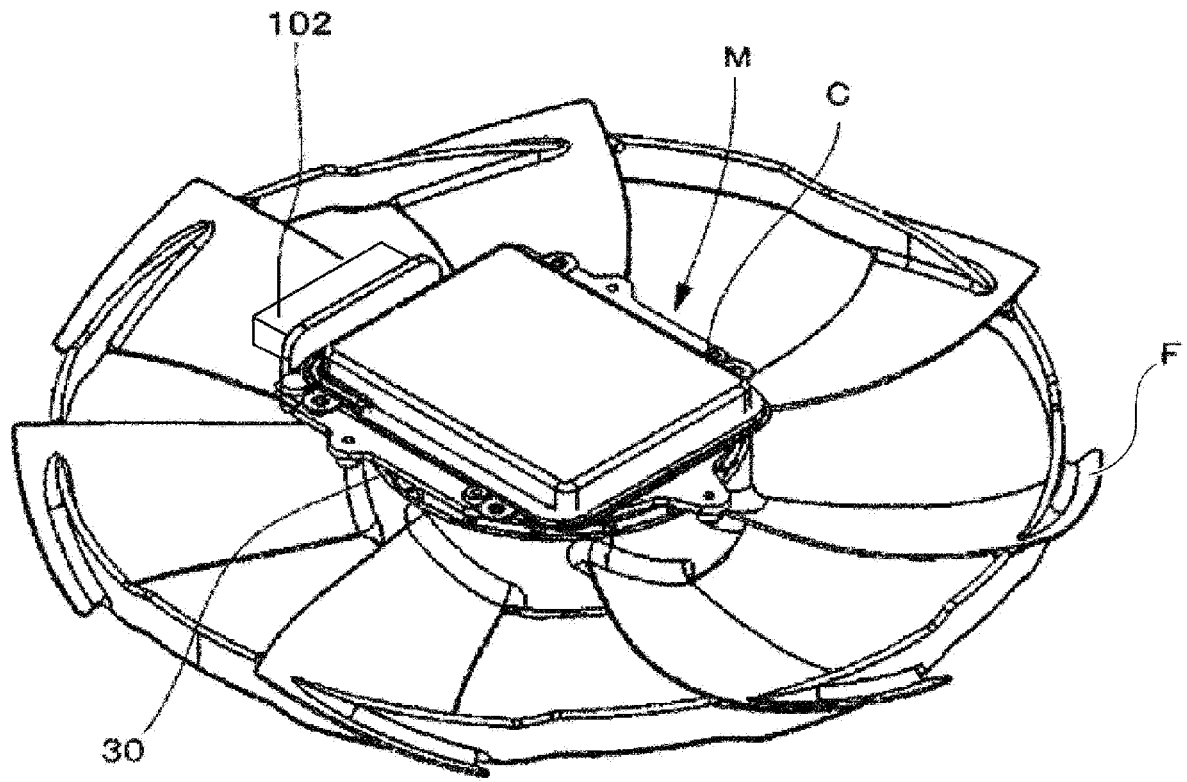
FIG. 4 is a perspective view illustrating the configuration of a fan device using a brushless motor according to a second embodiment.
Figure 5:
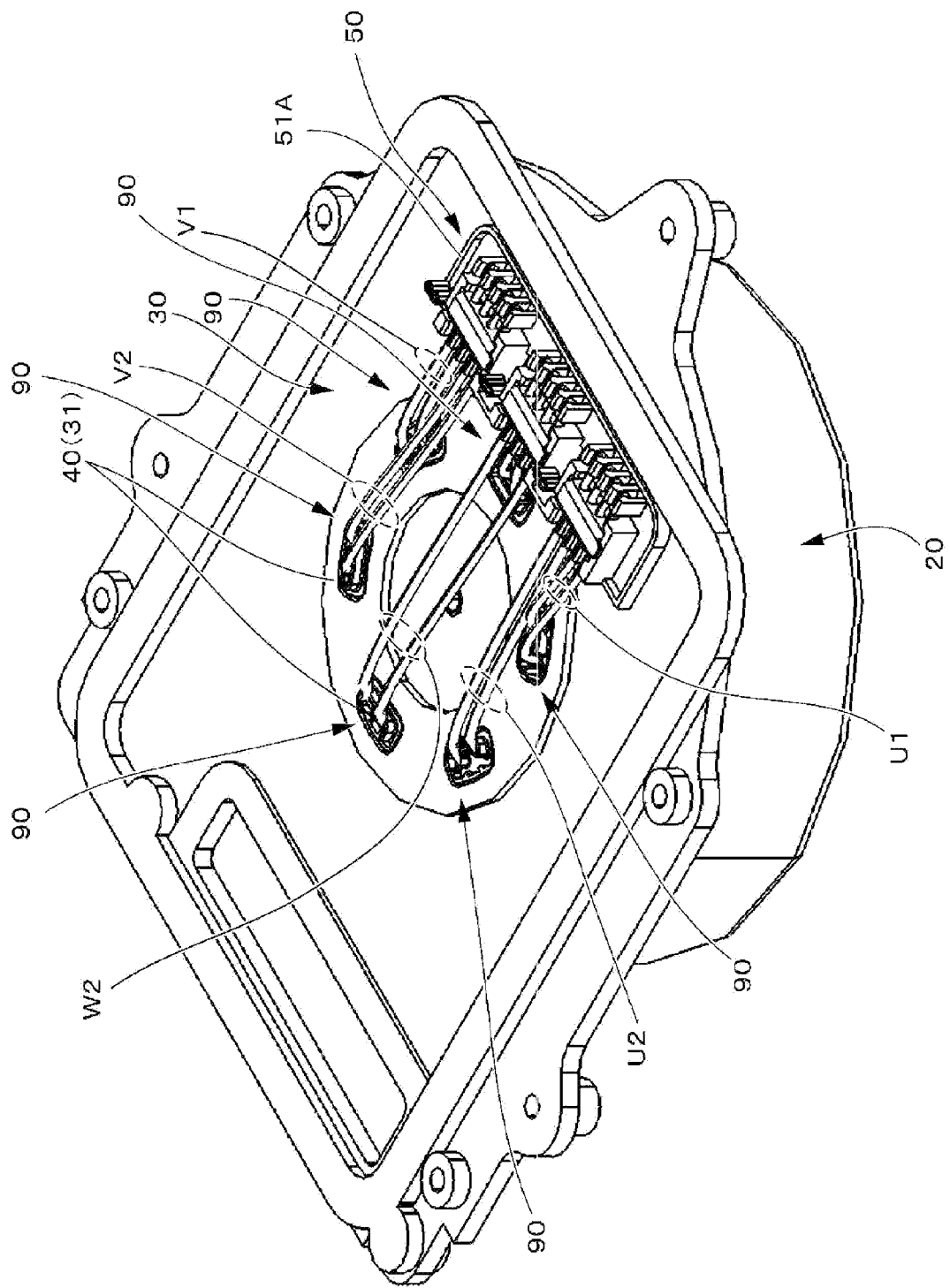
FIG. 5 is a perspective view of the brushless motor of the embodiment.
Figure 6A:
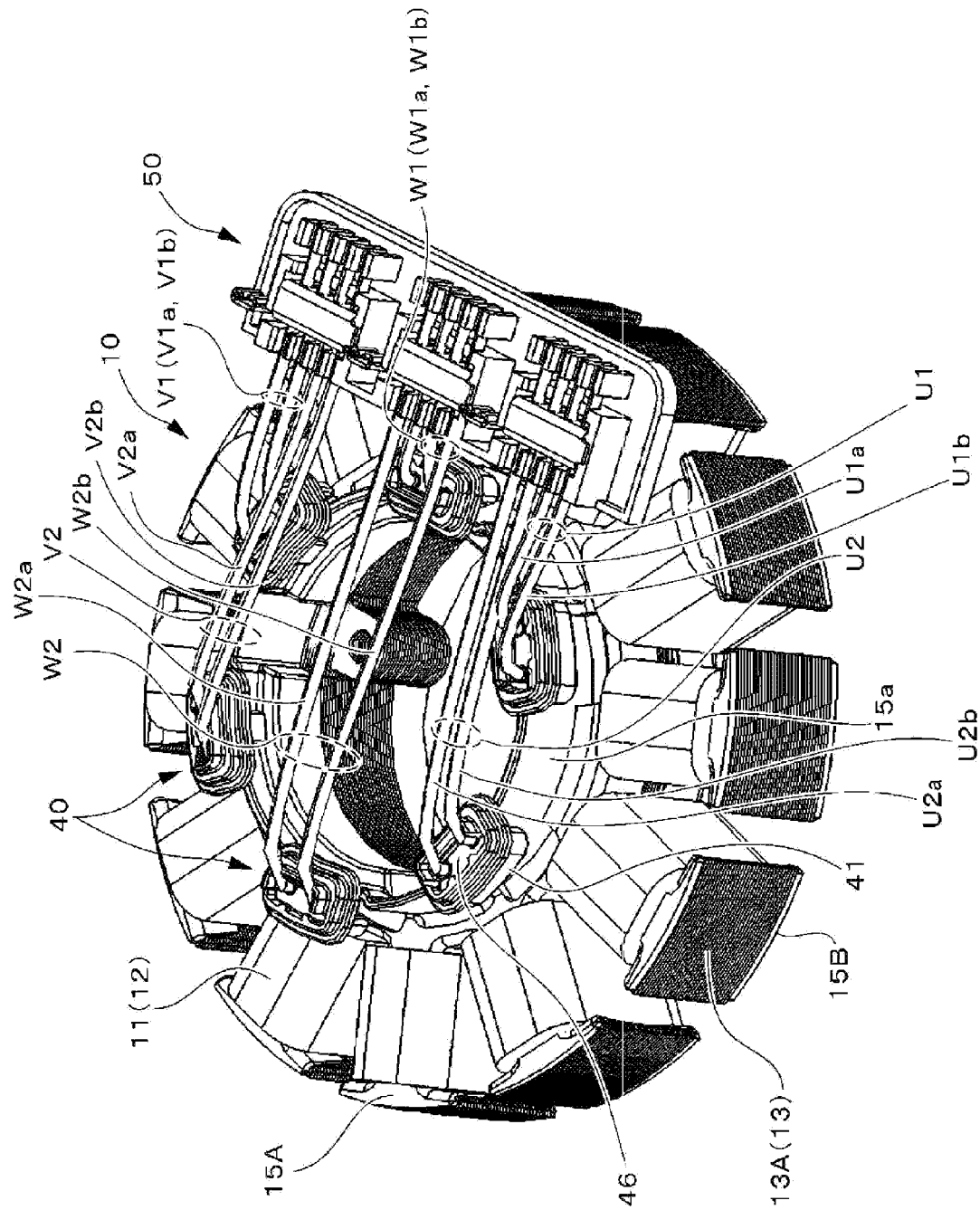
FIG. 6A is a perspective view illustrating the configuration of a power supply structure and a stator.
Figure 6C:
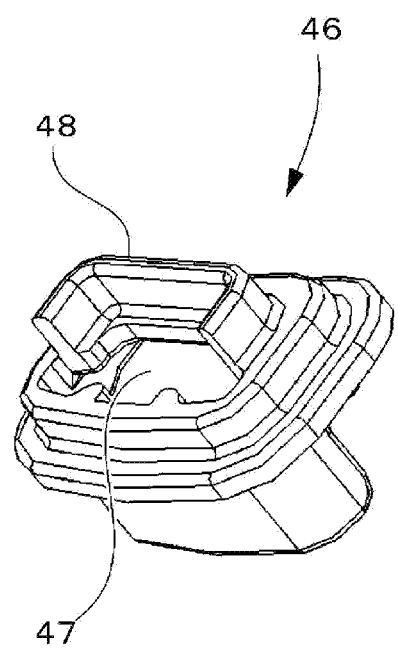
FIG. 6C is a perspective view of a cap member.
Figure 6D:
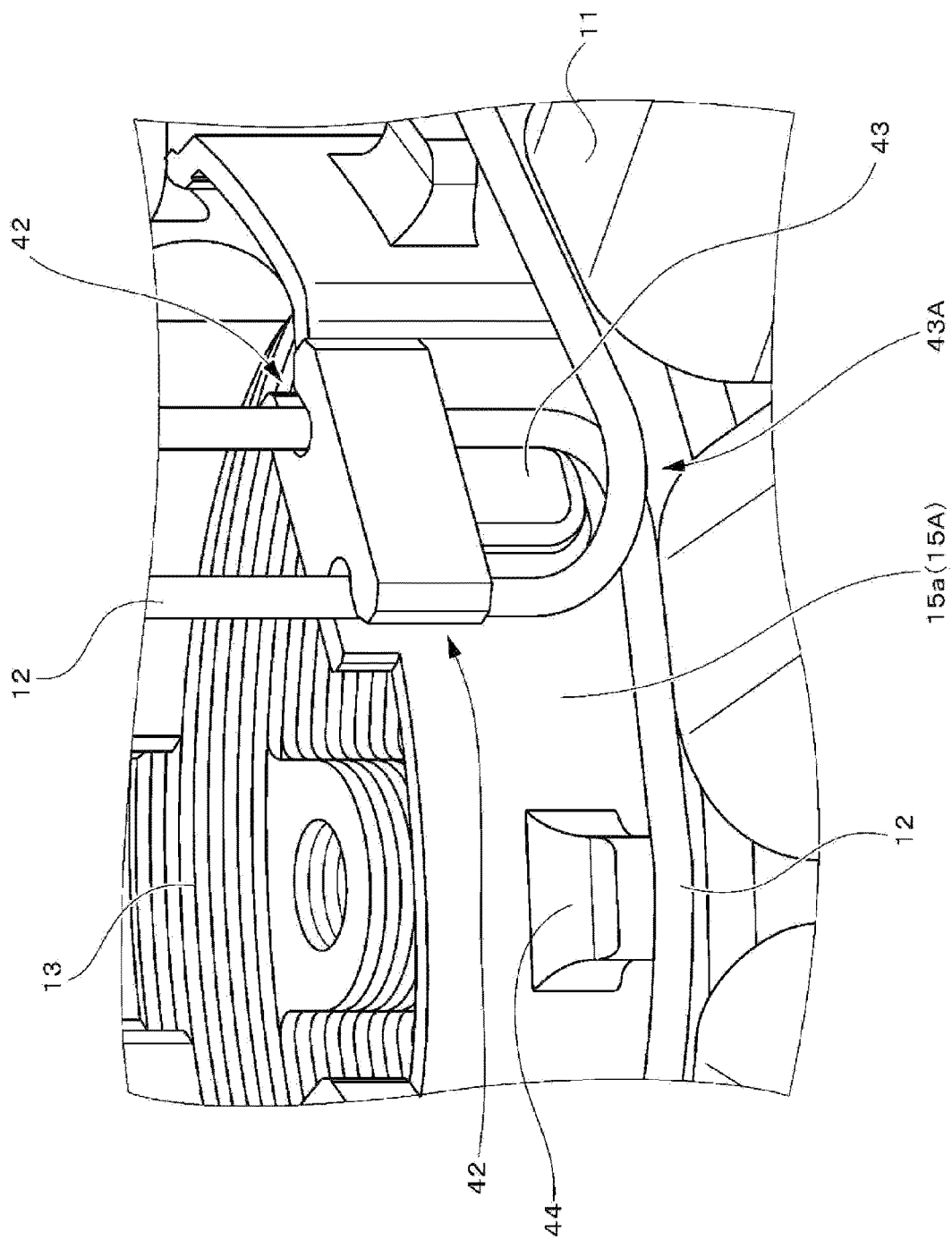
FIG. 6D is a perspective view illustrating a state of a winding guided by a support member.
Figure 6E:
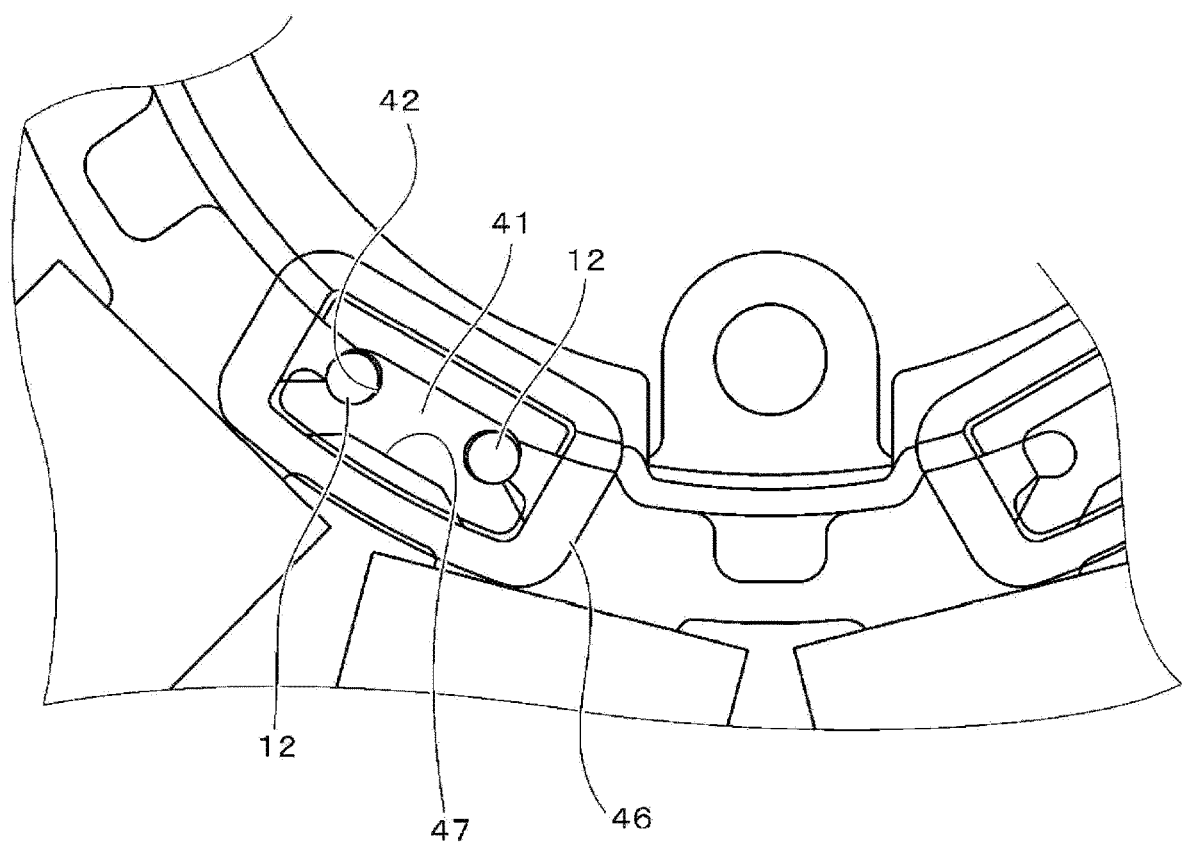
FIG. 6E is a diagram illustrating the positional relationship between the cap member and the winding as viewed in the axial direction.

FIG. 4 is a perspective view illustrating the configuration of a device using a brushless motor according to a second embodiment. FIG. 5 is a perspective view of the brushless motor of the embodiment. FIG. 6 is a perspective view of the brushless motor where a bracket is removed. FIG. 6A is a perspective view illustrating the configuration of a power supply structure and a stator. FIG. 6B is a perspective view of an insulator. FIG. 6C is a perspective view of a cap member. FIG. 6D is a perspective view illustrating a state of a winding guided by a support member. FIG. 6E is a diagram illustrating the positional relationship between the cap member and the winding as viewed in the axial direction. Note that some elements are not illustrated in these figures for the convenience of description.

As illustrated in FIG. 4, the brushless motor of this embodiment is a three-phase motor. For example, the brushless motor may be used, but not limited to, as part of a device that drives a fan unit F (see FIG. 4).

The brushless motor of the second embodiment includes a stator 10 having a plurality of (12 in this embodiment) coils 11 arranged in the circumferential direction, as illustrated in FIG. 6A. The brushless motor further includes the rotor 20 arranged on the outer circumferential side of the stator 10, as illustrated in FIG. 6.

As illustrated in FIG. 6A, the stator 10 includes a stator core 13, which is made of steel plates stacked in the axial direction and has a plurality of (12 in this embodiment) teeth 13A projecting outward in the circumferential direction. A winding 12 is wound around each of the teeth 13A of the stator core 13 to form the coils 11. The coils 11 each constitute a stator coil for each phase.

As illustrated in FIG. 6A, an insulator member 15A and an insulator member 15B are interposed between the winding 12 and the stator core 13 to insulate the winding 12 and the stator core 13 from each other. The insulator member 15A extends further than the coils 11 to the inner circumferential side and has a cylindrical inner circumferential portion 15a (FIGS. 6A and 6B).

The rotor 20 is rotatably supported about the rotary shaft 21 (see FIG. 6). The fan unit F (see FIG. 4) is attached to the rotor 20. As illustrated in FIG. 6, the brushless motor of the embodiment is configured as an outer-rotor motor in which the rotor 20 is located on the outer circumferential side of the stator 10.

The stator 10 is fixed to an aluminum bracket 30 (FIG. 5), which is arranged to cover the axial end face of a motor body M (the stator 10 and the rotor 20). The rotor 20 is also attached to the bracket 30 so as to be rotatable about the rotary shaft 21.

The bracket 30 is provided with six through holes 31 (FIG. 1), which are spaced at equal angles (60°) around the axis. Through the through holes 31, the winding 12 drawn out from the coils 11 passes through the bracket 30.

The brushless motor of the embodiment includes six guide parts 40 and a connector part 50 as a power supply structure.

The six guide parts 40 are spaced at equal angles (60°) around the axis so as to correspond to the through holes 31 of the bracket 30. The guide parts 40 are provided to guide the winding 12 such that the winding 12 is drawn out through the through holes 31 while ensuring the insulation between the winding 12 and the bracket 30. The winding 12 passes through the through holes 31 in the axial direction at a portion guided by each of the guide parts 40.

As illustrated in FIG. 6A, one of the guide parts 40 guides or supports a winding pair U1 including a lead portion U1a (an example of a first lead portion) of the winding 12 drawn from one of the coils 11 and a lead portion U1b (an example of a second lead portion) of the winding 12 drawn from another one of the coils 11.

Similarly, one of the guide parts 40 guides or supports a winding pair U2 including a lead portion U2a of the winding 12 drawn from one of the coils 11 and a lead portion U2b of the winding 12 drawn from another one of the coils 11.

Similarly, one of the guide parts 40 guides or supports a winding pair V1 including a lead portion V1a of the winding 12 drawn from one of the coils 11 and a lead portion V1b of the winding 12 drawn from another one of the coils 11. Another one of the guide parts 40 guides or supports a winding pair V2 including a lead portion V2a of the winding 12 drawn from one of the coils 11 and a lead portion V2b of the winding 12 drawn from another one of the coils 11.

Similarly, one of the guide parts 40 guides or supports a winding pair W1 including a lead portion W1a of the winding 12 drawn from one of the coils 11 and a lead portion W1b of the winding 12 drawn from another one of the coils 11. Another one of the guide parts 40 guides or supports a winding pair W2 including a lead portion W2a of the winding 12 drawn from one of the coils 11 and a lead portion W2b of the winding 12 drawn from another one of the coils 11.

As will be described below, the winding pairs U1 and U2, the winding pairs V1 and V2, and the winding pairs W1 and W2 correspond to three phases (U, V, W), respectively, and the winding pairs for each phase are connected to each other at the connector part 50.

The guide parts 40 each include a support member 41 (FIG. 6B) that supports or guides the winding 12 and a cap member 46 that is fitted to the support member 41.

As illustrated in FIG. 6B, the support member 41 is configured as part of the insulator member 15A and protrudes from the outer circumferential surface of the inner circumferential portion 15a (FIGS. 6A and 6B).

As illustrated in FIG. 6B, the support member 41 has two recesses 42 for receiving the winding 12 in the axial direction and a convex portion 43 that is arc-shaped as viewed from the outer circumferential side in the radial direction. The recesses 42 are open in the circumferential direction, and the winding 12 can be inserted through the opening.

As illustrated in FIG. 6D, the winding 12 (the first lead portion or the second lead portion) drawn out from each of the coils 11 in the circumferential direction is bent around the convex portion 43 along the arc shape of the convex portion 43. The winding 12 turned around the convex portion 43 is then drawn out in the axial direction through the recesses 42.

As illustrated in FIG. 6D, there may be provided a projection 44 that projects outward from the inner circumferential portion 15a to guide the axial position of the winding 12 wound around the inner circumferential portion 15a.

The cap member 46 (FIG. 6C) is fitted to the support member 41 and closes the opening of the recesses 42. Thus, the cap member 46 has the function of housing the winding 12 in the recesses 42. As illustrated in FIG. 6C, the cap member 46 has a through hole 47 which allows the winding 12 drawn in the axial direction to pass therethrough.

The winding 12 is housed between the through hole 47 and the recesses 42, and consequently a gap between the winding 12 and each of the guide parts 40 is very small. In addition, the cap member 46 is attached so as to close a corresponding one of the through holes 31. As a result, the through holes 31 are substantially closed by the winding 12 passing through the guide parts 40 and the recesses 42. Thus, it is possible to prevent a sealant for closing the through holes 31 from leaking through the through holes 31. The sealant is applied to an area that includes the support member 41, the cap member 46, and the winding 12 as viewed in the axial direction. Since the through holes 31 are closed by the sealant in this manner, the brushless motor of the embodiment has improved airtightness and can be applied to cases where waterproofness is required.

The cap member 46 also has a projection 48 (FIG. 6C) that projects in the axial direction from part of the opening end of the through hole 47.

Figure 7:
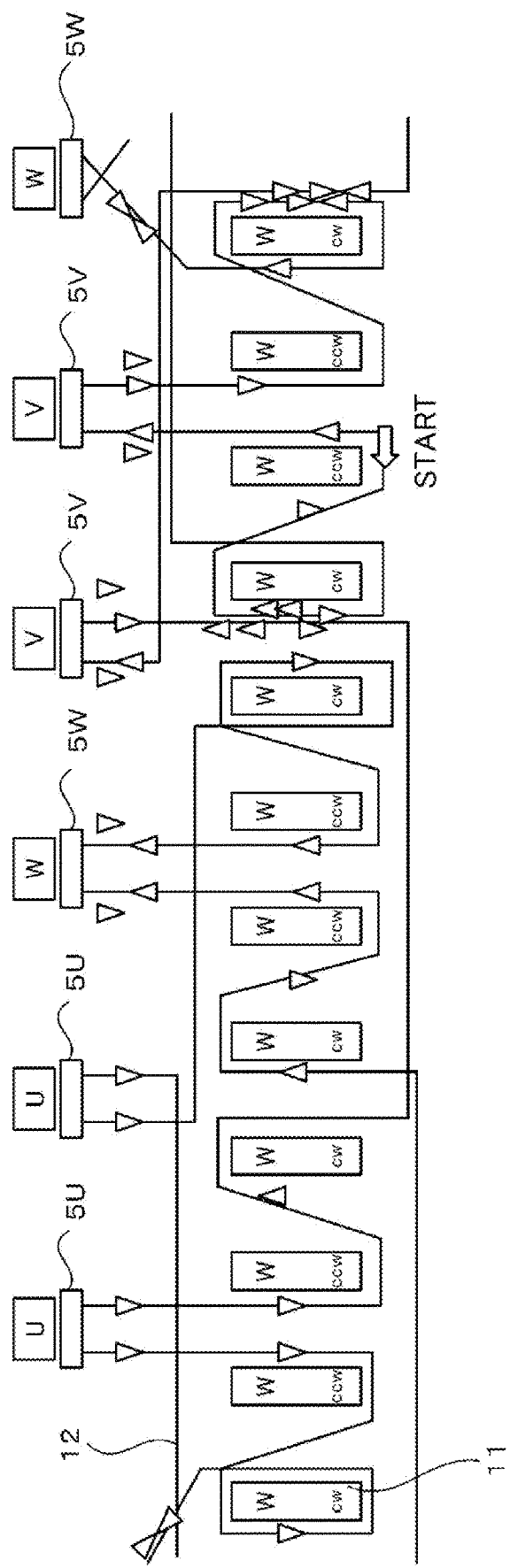
FIG. 7 is a diagram illustrating a connection relationship of the winding of stator coils.
Figure 7A:
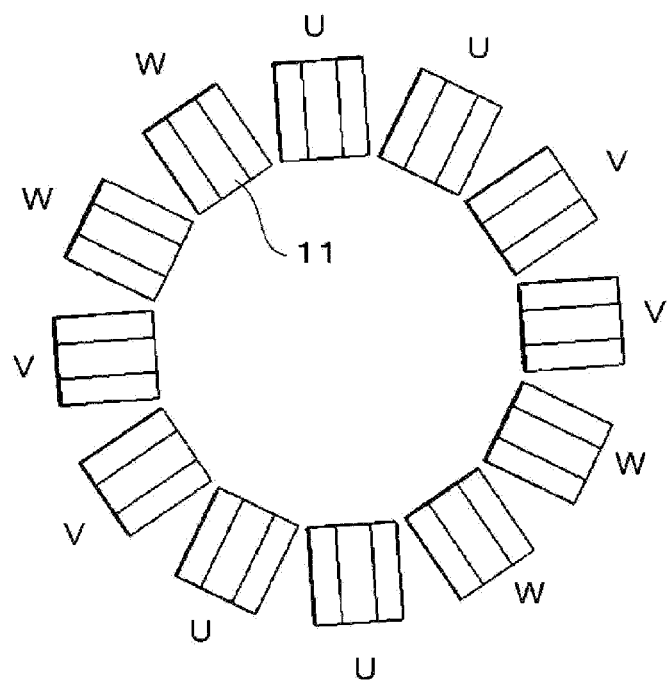
FIG. 7A is a diagram illustrating phases assigned to the stator coils as viewed in the axial direction.
Figure 7B:
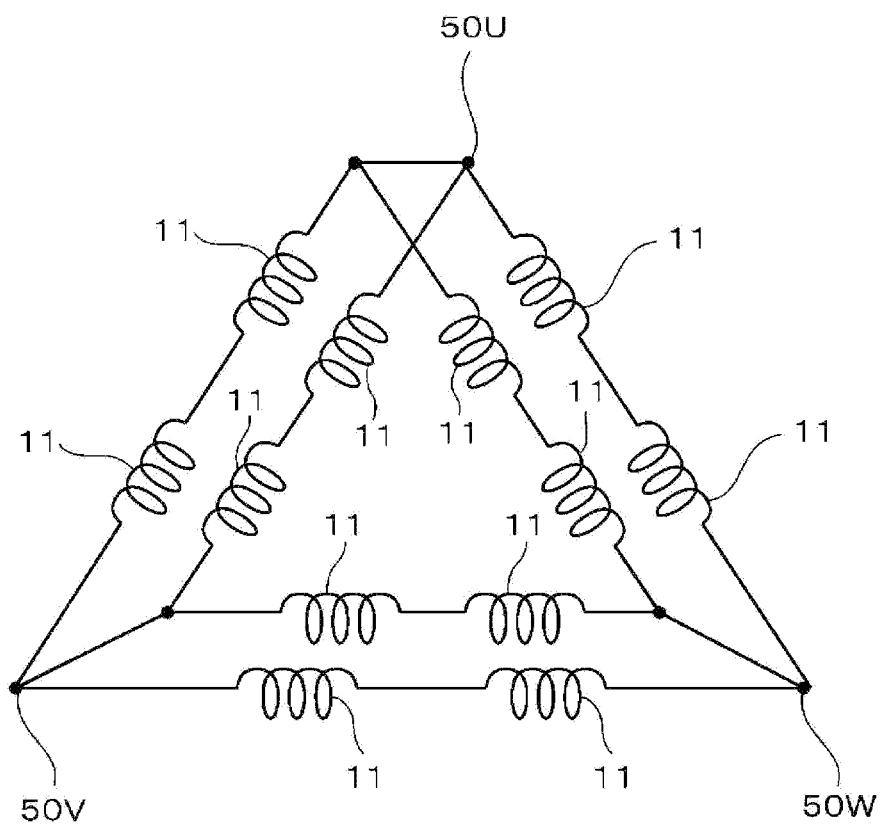
FIG. 7B is a diagram illustrating the connection state (delta connection) of the coils.

FIG. 7 is a diagram illustrating a connection relationship of the winding of the coils. FIG. 7A is a diagram illustrating phases assigned to the coils as viewed in the axial direction. FIG. 7B is a diagram illustrating the connection state (delta connection) of the coils.

In FIGS. 7 to 7B, the letters U, V, and W refer to the three phases U, V and W, respectively.

In this embodiment, a winding machine can be used to wind a continuous winding (12) around all the teeth 13A. In other words, the winding 12, including the above-mentioned winding pairs U1, U2, V1, V2, W1, and W2, can be led to the teeth 13A and wound around them by automatic winding without cutting the winding 12.

In the state illustrated in FIG. 7, the winding 12 is connected in a delta connection (FIG. 7B) using four coils 11 per phase, where two pairs of series-connected coils 11 are drawn to connector parts 50U, 50V, and 50W so as to be connected in parallel. In FIG. 7, connection points 5U, 5V, and 5W, each connected with two windings 12, correspond to the connector parts 50U, 50V, and 50W, respectively. Meanwhile, the winding pairs (the two windings 12) connected to the connection points 5U, 5V, and 5W correspond to the winding pairs U1 and U2, the winding pairs V1 and V2, and the winding pairs W1 and W2 connected to the connector parts 50U, 50V, and 50W, respectively.

In FIG. 7, "CW" and "CCW" indicate the direction in which the winding 12 is wound in each of the coils 11 (the clockwise direction and the counterclockwise direction when the coils 11 are viewed in the radial direction from the axial center). In addition, "START" indicates a starting point for winding the winding 12.

As illustrated in FIG. 7A, the four coils 11 for each of the phases U, V, and W are arranged such that the phases U, V, and W are rotationally symmetric about the axis of the rotary shaft 21.

Incidentally, the letters U, V and W given to the coils 11 in FIG. 7 correspond to the letters U, V and W given to the coils 11 in FIG. 7A.

On the other hand, the through holes 31 of the bracket 30 corresponding to the winding pairs U1 and U2, the winding pairs V1 and V2, and the winding pairs W1 and W2 are not located rotationally symmetrical with respect to each phase. In FIG. 6A, the through holes 31 are arranged counterclockwise in the following order: the one for the winding pair W1, the one for the winding pair V1, the one for the winding pair V2, the one for the winding pair W2, the one for the winding pair U2, and the one for the winding pair U1.

For the above reason, the winding 12 in the U-phase and the V-phase needs to be crossed with a crossover wire in between the coils 11 and the guide parts 40 so that the winding 12 drawn out from the coils 11 correspond to the locations of the winding pairs U1 and U2, the winding pairs V1 and V2, and the winding pairs W1 and W2.

In this regard, according to the embodiment, the winding 12 can be routed in both directions around the axis along the outer circumferential surface of the inner circumferential portion 15a (FIGS. 6A and 6B). Additionally, as illustrated in FIG. 6D, the winding 12 routed along the outer circumferential surface of the inner circumferential portion 15a (FIGS. 6A and 6B) is bent along the arc shape of the convex portion 43 of a corresponding one of the guide parts 40, whereby the winding 12 can be guided to a predetermined one of the through holes 31. Thus, the winding 12 can be routed appropriately and led to a predetermined one of the through holes 31 (the guide parts 40) regardless of the fact that the arrangement of the coils 11 for the respective phases does not correspond to the positional relationship of the winding pairs U1 and U2, the winding pairs V1 and V2, and the winding pairs W1 and W2. Furthermore, the winding 12 can be routed by automatic winding with a winding machine, which reduces the workload or man-hours required for forming the winding 12.

Next, the configuration of the connector part 50 will be described.

Figure 8:
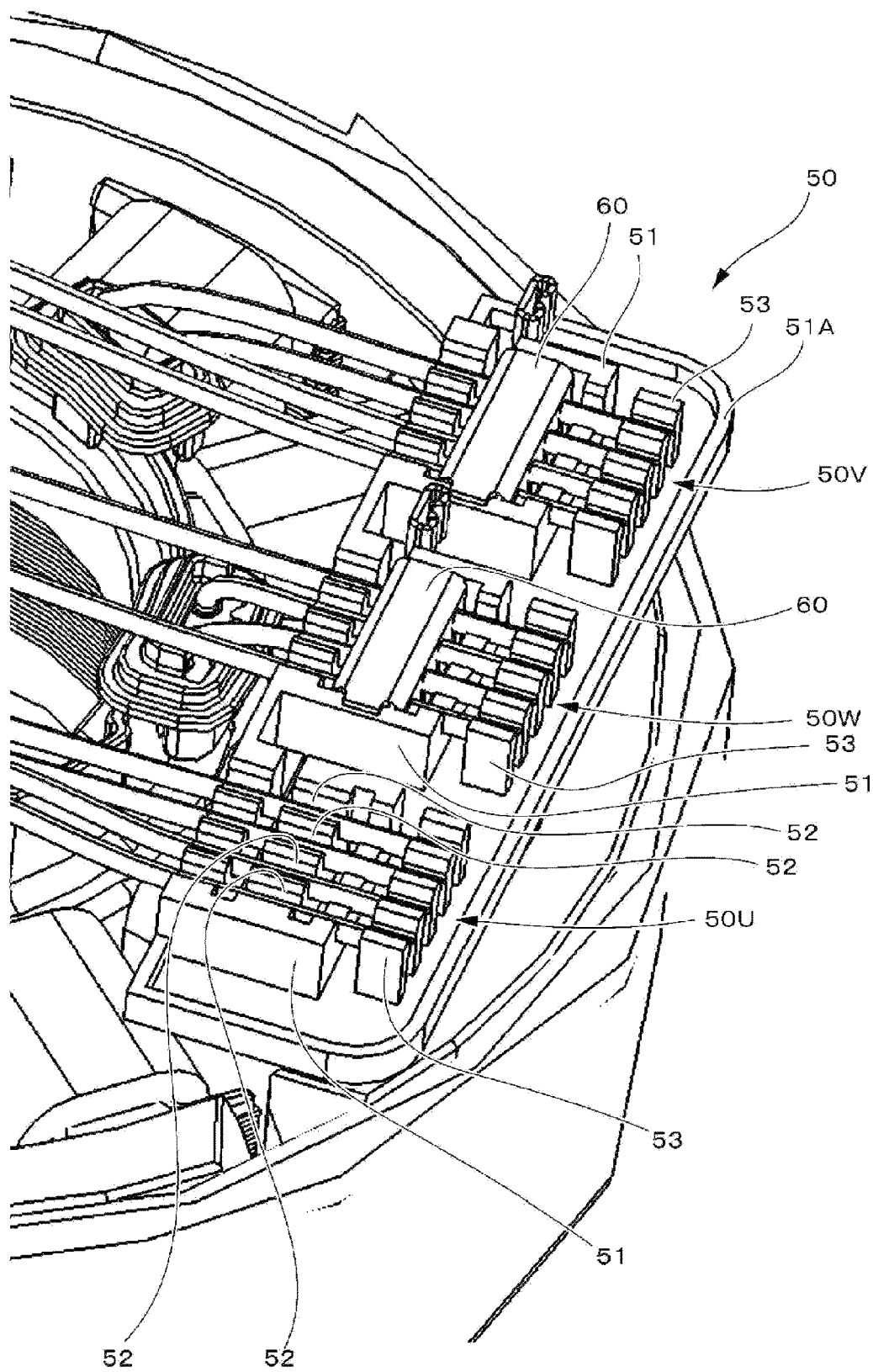
FIG. 8 is a partially enlarged view of the brushless motor illustrated in FIG. 6.
Figure 8A:
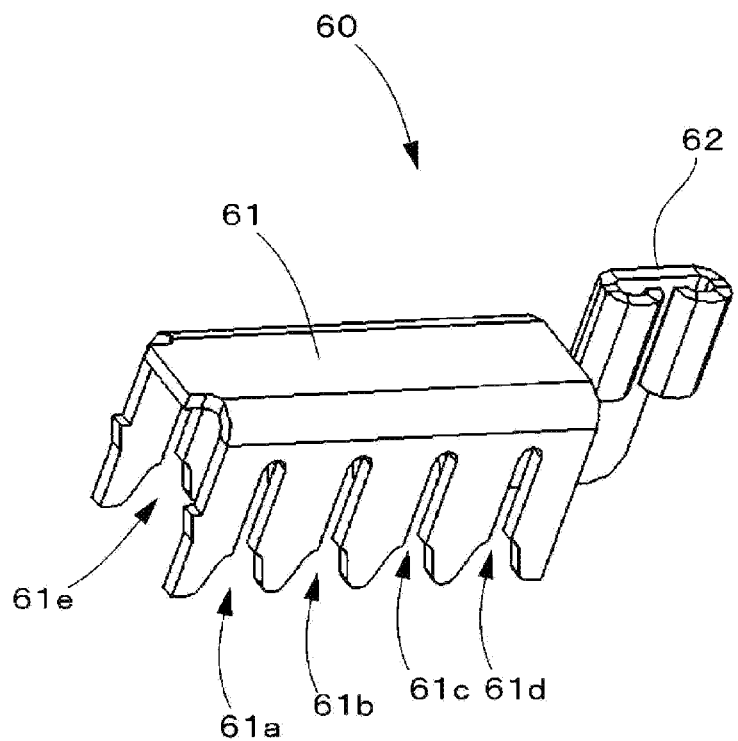
FIG. 8A is a perspective view of a terminal.
Figure 9:
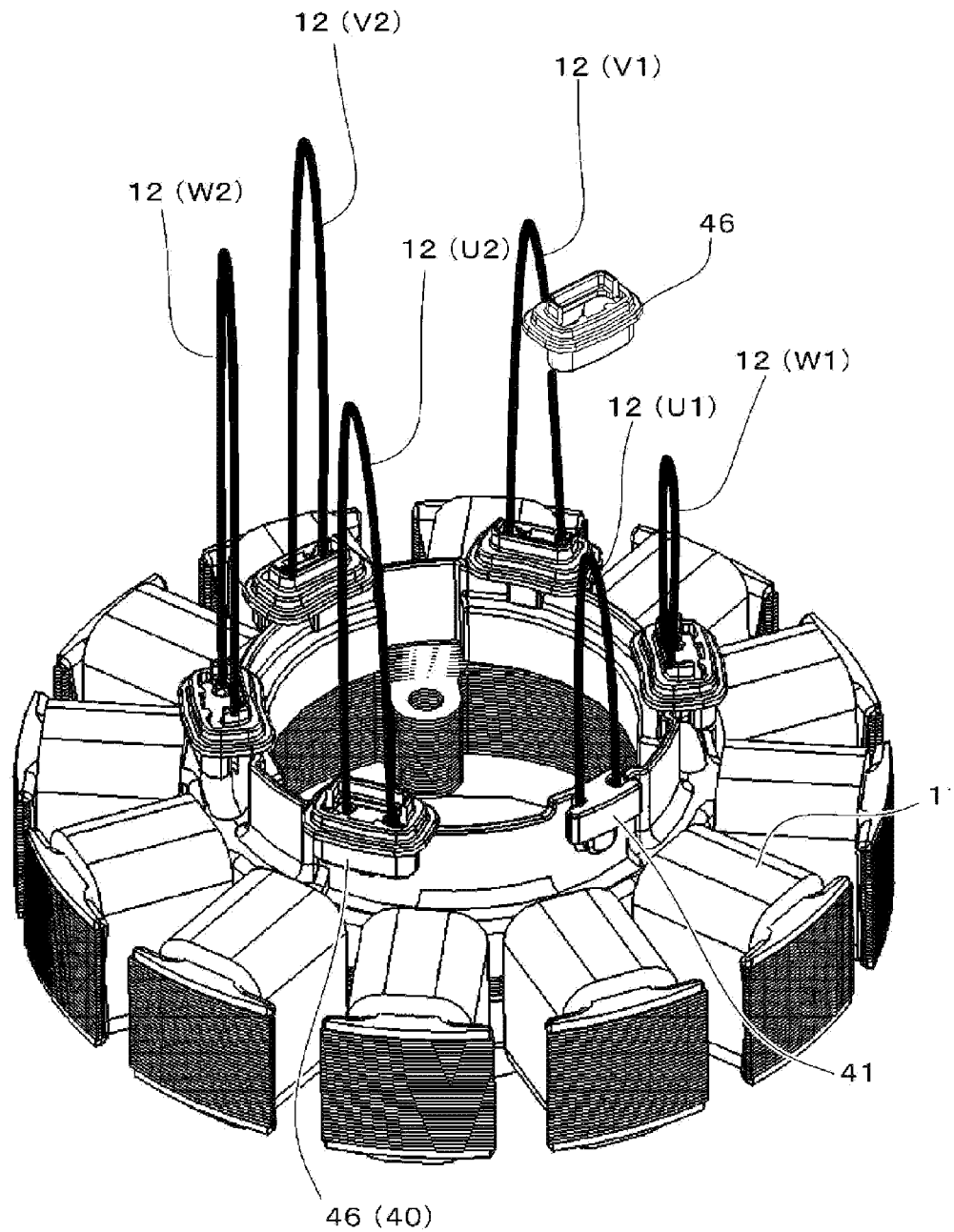
FIG. 9 is a perspective view illustrating how the winding is drawn out.
Figure 10:
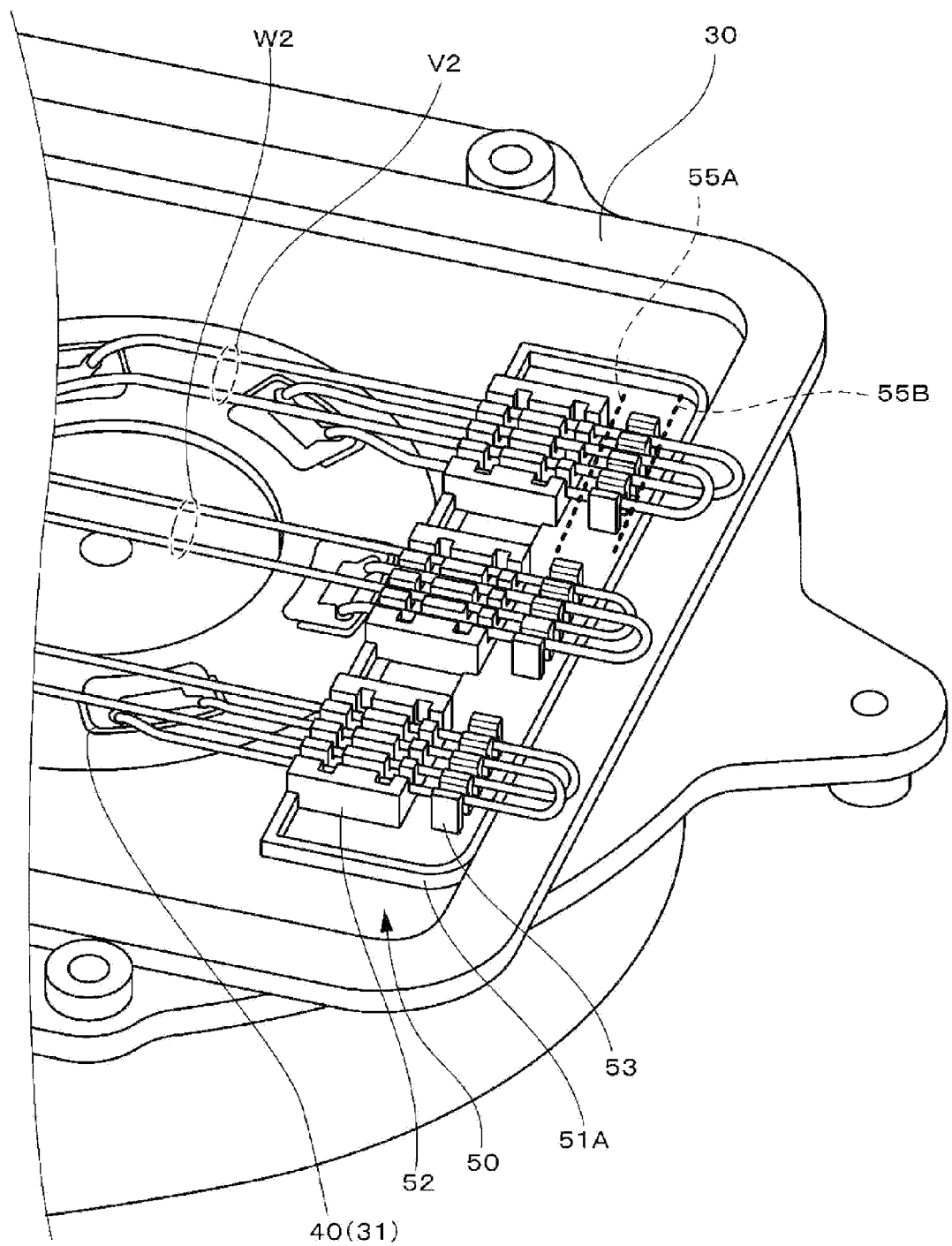
FIG. 10 is a perspective view of the winding held by a terminal holder.

FIG. 8 is a partially enlarged view of the brushless motor illustrated in FIG. 6. FIGS. 8A and 8A are perspective views of a terminal. FIG. 9 is a perspective view illustrating how the winding is drawn out. FIG. 10 is a perspective view of the winding held by a terminal holder.

As illustrated in FIG. 8, the connector part 50 includes the connector part 50U corresponding to the U-phase, the connector part 50V corresponding to the V-phase, and the connector part 50W corresponding to the W-phase. The connector parts 50U, 50V, and 50W are arranged linearly in a position offset from the axial center.

The connector parts 50U, 50V, and 50W each include a terminal 60 having a slit portion 61 (FIGS. 8A and 8B) and an insulating terminal holder 51 that holds the terminal 60. The slit portion 61 includes slits 61a to 61h to which the winding pairs U1 and U2, the winding pairs V1 and V2, or the winding pairs W1 and W2 are press-fitted. The terminal holders 51 of the connector parts 50U, 50V, and 50W are formed of a common insulating holder member 51A. As illustrated in FIG. 5, the holder member 51A is attached to the surface of the bracket 30 and ensures the insulation between the terminals 60 and the bracket 30 by virtue of its insulating properties.

As illustrated in FIG. 8, the terminal holders 51 of the connector parts 50U, 50V, and 50W each have four groove-shaped guides 52 that guide the winding pairs U1 and U2, the winding pairs V1 and V2, or the winding pairs W1 and W2. As illustrated in FIG. 8, the tip portions of the winding pairs U1 and U2, the winding pairs V1 and V2, and the winding pairs W1 and W2 are housed in the guides 52. Note that, in the illustration of FIG. 8, the terminal 60 of the connector part 50U is removed to show the configuration of the terminal holder 51. Additionally, FIG. 5 illustrates the guides 52 only for the terminal holder 51 of the connector part 50U.

In addition, as illustrated in FIG. 8, the terminal holders 51 of the connector parts 50U, 50V, and 50W are provided with claws 53 for temporarily holding the winding pairs U1 and U2, the winding pairs V1 and V2, and the winding pairs W1 and W2, respectively. The claws 53 each have a groove located on an extension of a corresponding one of the guides 52. The claws 53 engage the tip portions of the winding pairs U1 and U2, the winding pairs V1 and V2, and the winding pairs W1 and W2 housed in the grooves. The claws 53 thus have the function of temporarily holding the tip portions of the winding pairs U1 and U2, the winding pairs V1 and V2, and the winding pairs W1 and W2.

Although the diameter of the winding 12 is not particularly limited, if the winding 12 has a large diameter such as, for example, 1 mm or more, the winding pairs U1 and U2, the winding pairs V1 and V2, and the winding pairs W1 and W2 may be too rigid to be readily housed in the guides 52 without temporary holding. Accordingly, in this embodiment, the claws 53 are provided to secure the positions of the winding pairs U1 and U2, the winding pairs V1 and V2, and the winding pairs W1 and W2. Thereby, the winding pairs U1 and U2, the winding pairs V1 and V2, and the winding pairs W1 and W2 can be correctly positioned in the guides 52.

Figure 8B:
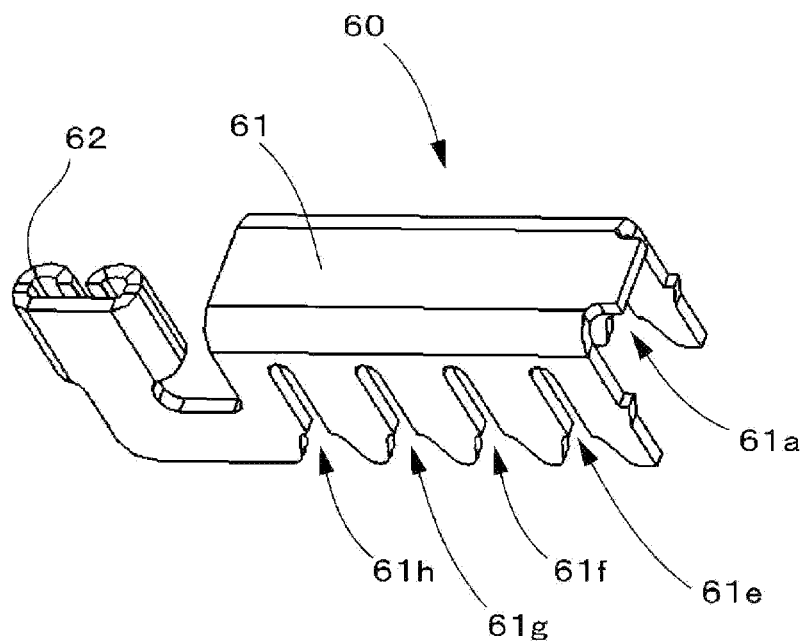
FIG. 8B is another perspective view of the terminal.

The terminal 60 illustrated in FIGS. 8A and 8B is made of conductive metal and has eight slits 61a to 61h. The terminal 60 also has a terminal portion 62 to which an output terminal of each phase of the drive circuit is connected.

As illustrated in FIGS. 8 to 8B, the terminal holder 51 has an uneven shape corresponding to the shape of the terminal 60, and thus the terminal 60 is stably fixed to the terminal holder 51 when inserted therein. In addition, since the winding pairs U1 and U2, the winding pairs V1 and V2, and the winding pairs W1 and W2 are press-fitted to their corresponding terminals 60 while being housed in the guides 52, it is possible to ensure reliable conduction between the winding pairs U1 and U2, the winding pairs V1 and V2, and the winding pairs W1 and W2 and the terminals 60.

According to the embodiment, the winding pairs U1 and U2, the winding pairs V1 and V2, and the winding pairs W1 and W2 are press-fitted to the slits 61a to 61h and thereby connected to their respective terminals 60. When the winding pairs are press-fitted to the terminal 60, the terminal 60 scrapes off the insulation coating of the winding 12 and is pressed against the scraped winding 12 to be electrically connected to the winding 12. This allows four windings 12 to be connected at one time without welding, simplifying the manufacturing process. In addition, there is no need to use fusing, projection welding, or the like. Furthermore, the winding pairs U1 and U2, the winding pairs V1 and V2, and the winding pairs W1 and W2 can be connected to the corresponding terminals 60 without using an electrode made of a heat-resistant tungsten material or the like.

Described below is the process of connecting the winding pairs U1 and U2, the winding pairs V1 and V2, and the winding pairs W1 and W2 to the connector parts 50U, 50V, and 50W, respectively.

As illustrated in FIG. 9, before being connected to the connector parts 50U, 50V, and 50W, the winding 12, which constitutes the winding pairs U1 and U2, the winding pairs V1 and V2, and the winding pairs W1 and W2, is continuous in the form of a loop without being cut. The winding 12 is drawn upward in FIG. 9 through the support member 41. Incidentally, all processes for winding the winding 12 up to the state illustrated in FIG. 4 can be performed using a winding machine.

The winding pairs U1 and U2, the winding pairs V1 and V2, and the winding pairs W1 and W2 are then each passed through the through hole 47 of the cap member 46, and the cap member 46 is fitted to the support member 41, whereby the first portions of the winding pairs U1 and U2, the winding pairs V1 and V2, and the winding pairs W1 and W2, i.e., the portions to be passed through the through holes 31, are fixed by the guide parts 40. In this state, the winding pairs U1 and U2, the winding pairs V1 and V2, and the winding pairs W1 and W2 can be fed through the through holes 31 of the bracket 30.

Next, the winding pairs U1 and U2, the winding pairs V1 and V2, and the winding pairs W1 and W2 are each bent about 90° to the right in FIG. 9 at a bent portion 90 at the axially outer end (FIG. 5, an example of an axially outer end). As a result, the tip portions of the winding pairs U1 and U2, the winding pairs V1 and V2, and the winding pairs W1 and W2 reach the connector parts 50U, 50V, and 50W, respectively. As illustrated in FIG. 10, the tip portions of the winding pairs U1 and U2, the winding pairs V1 and V2, and the winding pairs W1 and W2 are inserted into the corresponding guides 52 and engaged with the grooves of the claws 53. Thereby, the tip portions of the winding pairs U1 and U2, the winding pairs V1 and V2, and the winding pairs W1 and W2 are held by the claws 53 while being housed in the guides 52.

The lengths of the winding pairs U1 and U2, the winding pairs V1 and V2, and the winding pairs W1 and W2 may be set so that the tip portions thereof reach the connector part 50 with less excess length. Specifically, the length of a portion (an example of a second portion) of a winding pair (U1, U2, V1, V2, W1, W2) from a corresponding one of the guide parts 40 to a connector part (50U, 50V, 50W) corresponds to the distance from the corresponding one of the guide parts 40 to the connector part (50U, 50V, 50W). That is, the length of the second portion varies depending on the distance from the guide part 40 corresponding to each winding pair to the connector part (50U, 50V, 50W). In addition, the second portion of each winding pair (U1, U2, V1, V2, W1, W2) has the same length in the lead portion U1a, U2a, V1a, V2a, W1a, or W2a and the lead portion U1b, U2b, V1b, V2b, W1b, or W2b. Accordingly, as will be described later, the winding pairs U1 and U2, the winding pairs V1 and V2, and the winding pairs W1 and W2 are each arranged substantially linearly. This eliminates the risk of connecting the winding pairs U1 and U2, the winding pairs V1 and V2, and the winding pairs W1 and W2 to the wrong connector parts 50U, 50V, and 50W.

Next, the terminals 60 are fitted to the terminal holders 51 of the connector parts 50U, 50V, and 50W, whereby the winding pairs U1 and U2, the winding pairs V1 and V2, and the winding pairs W1 and W2 are press-fitted to their corresponding slits 61a to 61h. At this time, the edges of the slits 61a to 61h scrape off the insulation coating of the winding pairs U1 and U2, the winding pairs V1 and V2, and the winding pairs W1 and W2, thereby ensuring conduction between the conductors of the winding pairs U1 and U2, the winding pairs V1 and V2, and the winding pairs W1 and W2 and their corresponding terminals 60. As a result, the winding pairs for the same phase, i.e., the winding pairs U1 and U2, the winding pairs V1 and V2, and the winding pairs W1 and W2, conduct each other.

After that, the tip portions of the winding pairs U1 and U2, the winding pairs V1 and V2, and the winding pairs W1 and W2 are cut along a straight line 55A or a straight line 55B. This removes the unwanted looped portions of the winding pairs U1 and U2, the winding pairs V1 and V2, and the winding pairs W1 and W2.

In this manner, as illustrated in FIG. 6A, the winding pairs U1 and U2, the winding pairs V1 and V2, and the winding pairs W1 and W2 are arranged such that windings of each pair extend substantially linearly and substantially parallel to each other. As a result, winding pairs for different phases do not cross one another as viewed in the axial direction. This prevents contact and conduction between winding pairs for different phases.

According to the embodiment, the winding pairs U1 and U2, the winding pairs V1 and V2, and the winding pairs W1 and W2, which correspond to twelve leads of the winding 12 drawn from the coils 11, are bent in the same direction, and thereby the winding pairs for the three phases U, V, and W can be collectively connected to the connector parts 50U, 50V, and 50W, respectively. In other words, the twelve leads of the winding 12 are integrated into six pairs of windings, and the conduction between the leads of the winding 12 that constitute each pair of windings can be ensured without operational burden. This improves the work efficiency of connecting the winding 12 drawn from the coils 11 to the terminals 60.

In addition, the twelve leads of the winding 12 are collectively connected to the three connector parts 50U, 50V, and 50W with respect to each phase, which facilitates the process of connecting the winding to the drive circuit. Furthermore, the connector part does not require a complex configuration.

Figure 11:
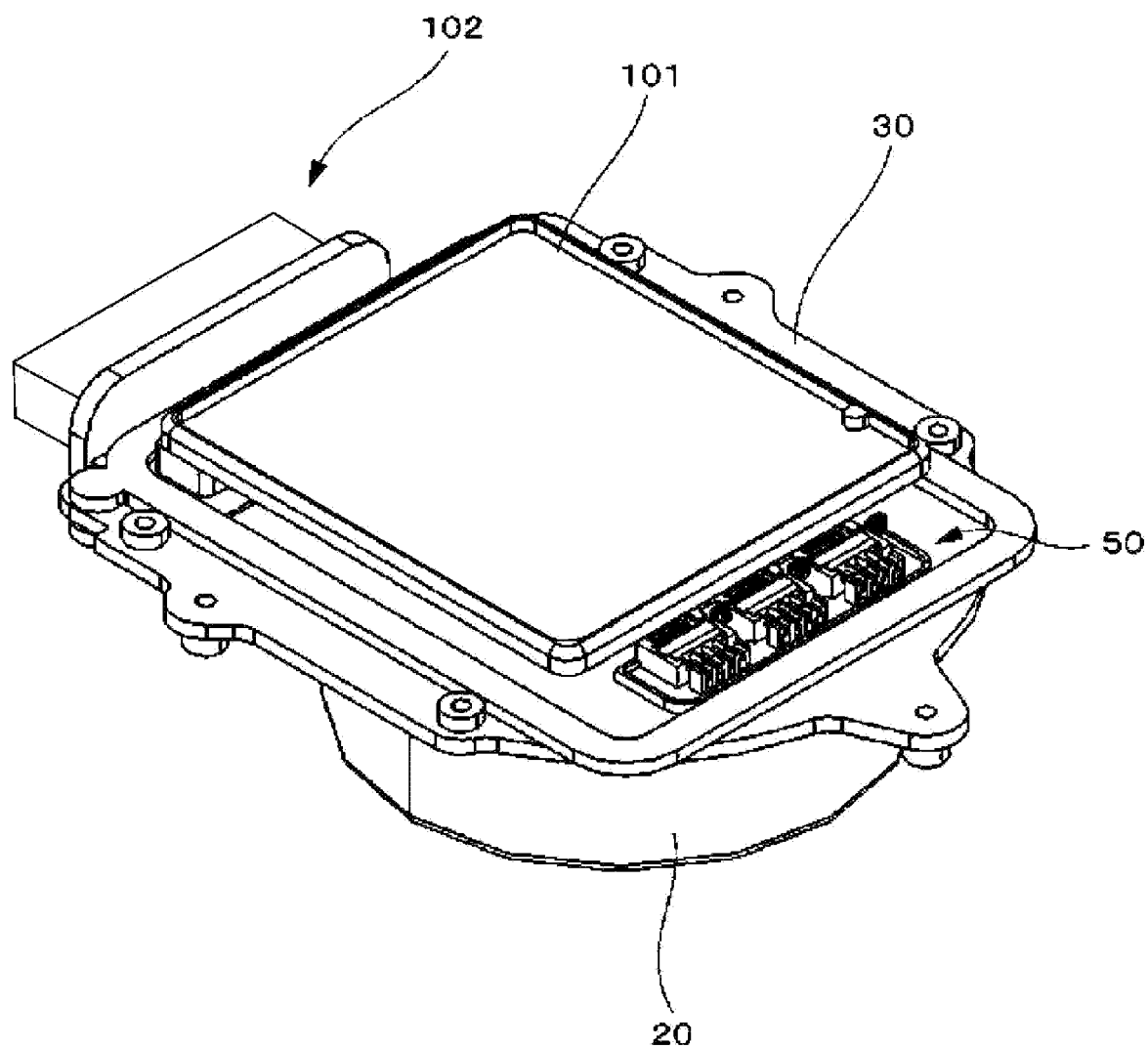
FIG. 11 is a perspective view illustrating a state where a drive circuit is attached.

Next, as illustrated in FIG. 11, a drive circuit board 101 having the drive circuit mounted thereon is installed above the bracket 30 in FIG. 10 together with a cover C (FIG. 4). At this time, output terminals (not illustrated) for the three phases U, V, and W drawn out from or mounted on the drive circuit board 101 are each fitted and connected to the terminal portion 62 of the terminal 60 of a corresponding one of the connector parts 50U, 50V, and 50W for the respective phases. In this state, the winding pairs U1 and U2, the winding pairs V1 and V2, and the winding pairs W1 and W2 are housed in a gap secured between the bracket 30 and the drive circuit board 101. A member may be inserted between the drive circuit board 101 and the winding pairs U1 and U2, the winding pairs V1 and V2, and the winding pairs W1 and W2 to ensure the insulation therebetween.

As illustrated in FIG. 11, in this embodiment, the drive circuit board 101 and the connector part 50 are mounted in areas that are separated from each other as viewed in the axial direction. This prevents interference between the drive circuit board 101 and the connector part 50 and also suppresses the height of the cover C in the axial direction.

As illustrated in FIG. 11, a connection module 102 (FIG. 4) is arranged near the drive circuit board 101. The drive circuit board 101 is supplied with power and input signals for controlling the outputs of the three phases U, V, and W through the connection module 102. Therefore, the drive circuit can be mounted so that signals and power flow in one direction from the connection module 102 side to the connector part 50 side in the drive circuit board 101. Thus, the drive circuit board 101 can be reduced in size by streamlining the circuit pattern. In addition, since the drive circuit only needs to provide the outputs of the three phases in a row according to the arrangement of the connector parts 50U, 50V, and 50W, the drive circuit can be simplified.

Third Embodiment

Figure 12:
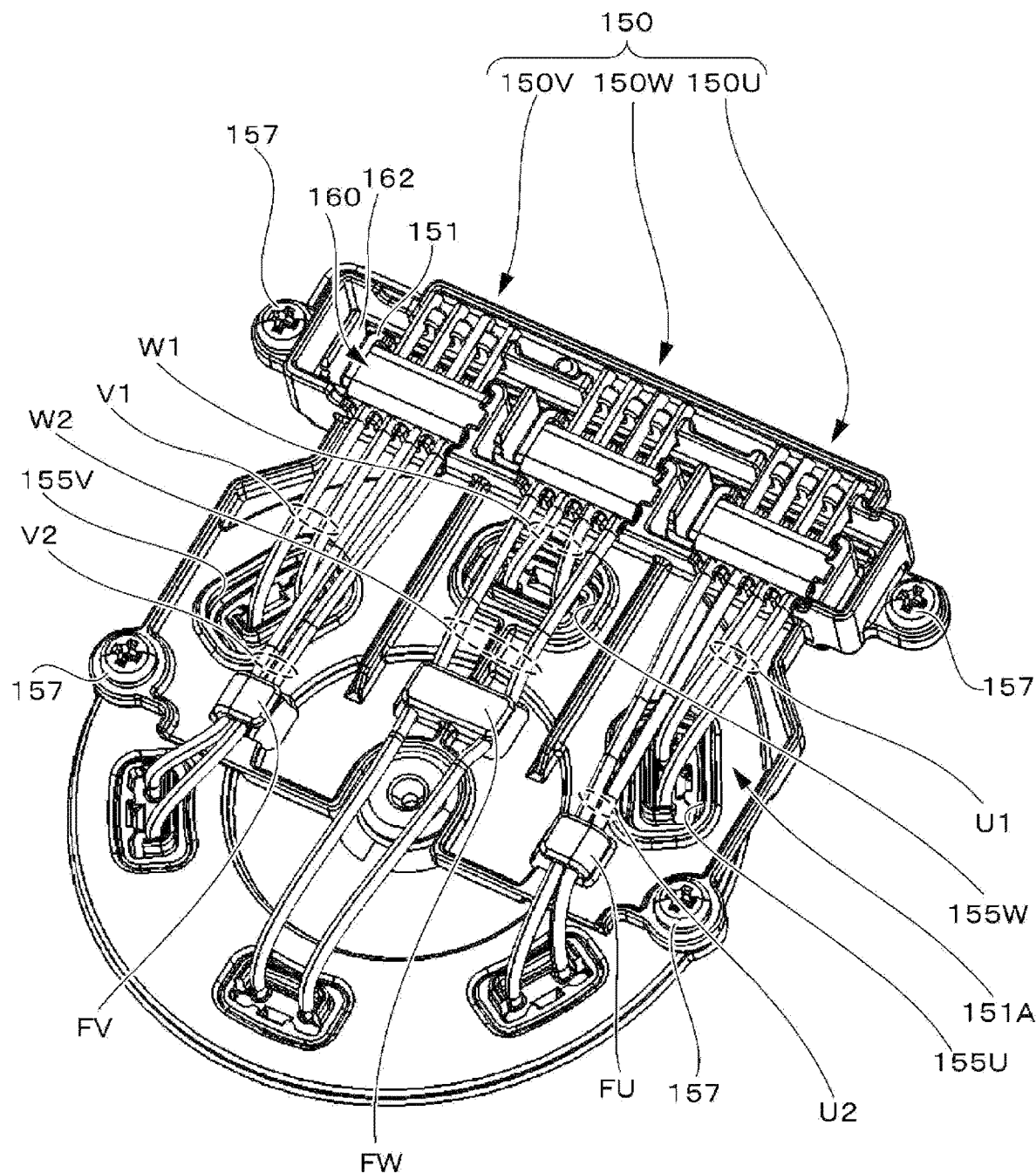
FIG. 12 is a perspective view illustrating another example of the configuration of a connector part.
Figure 13:
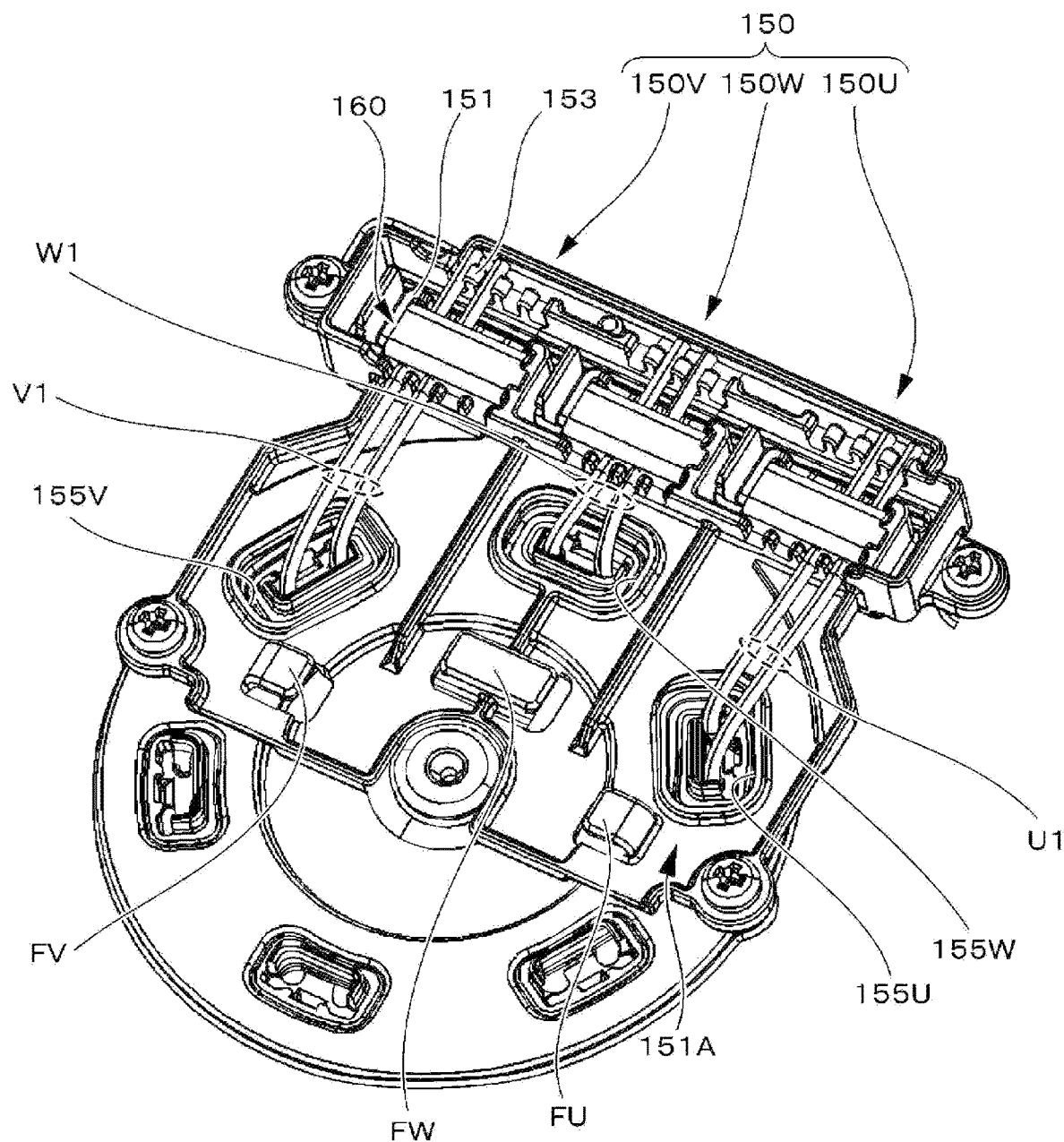
FIG. 13 is a perspective view illustrating another example of the configuration of the connector part.

FIGS. 12 and 13 are perspective views illustrating another example of the configuration of a connector part.

As illustrated in FIG. 12, a connector part 150 includes a connector part 150U corresponding to the U-phase, a connector part 150V corresponding to the V-phase, and a connector part 150W corresponding to the W-phase. The connector parts 150U, 150V, and 150W are arranged linearly in a position offset from the axial center.

The connector parts 150U, 150V, and 150W each include a terminal 160 having a slit portion and an insulating terminal holder 151 that holds the terminal 160. The slit portion includes slits (corresponding to the slits 61a to 61h) to which the winding pairs U1 and U2, the winding pairs V1 and V2, or the winding pairs W1 and W2 are press-fitted. The terminal holders 151 of the connector parts 150U, 150V, and 150W are formed of a common insulating holder member 151A. The holder member 151A is attached to the surface of the bracket 30 through an attachment screw 157 and ensures the insulation between the terminal 160 and the bracket 30 by virtue of its insulating properties.

The holder member 151A includes a through hole 155U that allows the winding pair U1 to pass therethrough, a through hole 155V that allows the winding pair V1 to pass therethrough, and a through hole 155W that allows the winding pair W1 to pass therethrough. The through holes 155U, 155V, and 155W are each provided so as to face a corresponding one of the through holes 31.

The holder member 151A further includes a hook FU that supports the winding pair U2, a hook FV that supports the winding pair V2, and a hook FW that supports the winding pair W2. This makes it possible to fix the positions of the winding pairs U2, V2, and W2, which are drawn longer than the winding pairs U1, V1, and W1.

As illustrated in FIG. 12, the terminal holders 151 of the connector parts 150U, 150V, and 150W each have four groove-shaped guides (corresponding to the guides 52) that guide the winding pairs U1 and U2, the winding pairs V1 and V2, or the winding pairs W1 and W2. As illustrated in FIG. 9, the tip portions of the winding pairs U1 and U2, the winding pairs V1 and V2, and the winding pairs W1 and W2 are housed in the guides.

In addition, as illustrated in FIG. 12, the terminal holders 151 of the connector parts 150U, 150V, and 150W are provided with claws 153 (corresponding to the claws 53) for temporarily holding the winding pairs U1 and U2, the winding pairs V1 and V2, and the winding pairs W1 and W2, respectively. The claws 153 have the function of temporarily holding the tip portions of the winding pairs U1 and U2, the winding pairs V1 and V2, and the winding pairs W1 and W2.

The terminal 160 is made of conductive metal and has eight slits (corresponding to the slits 61a to 61h). The terminal 160 also has a male terminal portion 162 to which an output terminal of each phase of the drive circuit is connected.

Note that the terminal portion 162 does not rise from the area of the slit portion (corresponding to the slit portion 61) where the slits are formed but is located in a position outside of the area in a plane perpendicular to the axial direction. As a result, the height (height in the axial direction) of the terminal portion 162 can be suppressed, and, for example, the space required for the connection can be reduced.

As illustrated in FIG. 12, the terminal holder 151 has an uneven shape corresponding to the shape of the terminal 160, and thus the terminal 160 is stably fixed to the terminal holder 151 when inserted therein. In addition, since the winding pairs U1 and U2, the winding pairs V1 and V2, and the winding pairs W1 and W2 are press-fitted to their corresponding terminals 160 while being housed in the guides (corresponding to the guides 52), it is possible to ensure reliable conduction between the winding pairs U1 and U2, the winding pairs V1 and V2, and the winding pairs W1 and W2 and the terminals 160.

According to the embodiment, the winding pairs U1 and U2, the winding pairs V1 and V2, and the winding pairs W1 and W2 are press-fitted to the slits and thereby connected to their respective terminals 160. Therefore, there is no need to use fusing, projection welding, or the like. Thus, the winding pairs U1 and U2, the winding pairs V1 and V2, and the winding pairs W1 and W2 can be connected to the corresponding terminals 160 without using an electrode made of a heat-resistant tungsten material or the like.

The process of connecting the winding pairs U1 and U2, the winding pairs V1 and V2, and the winding pairs W1 and W2 to the connector parts 150U, 150V, and 150W is performed in the same manner as the process of connecting them to the connector parts 50U, 50V, and 50W described above.

FIG. 13 illustrates an example in which only the winding pairs U1, V1, and W1 are connected to the connector parts 150U, 150V, and 150W, respectively, i.e., there are no winding pairs U2, V2, and W2 to be connected to the connector parts 150U, 150V, and 150W. As illustrated in FIG. 13, the same holder member 151A as in the example of FIG. 12 can still be used in this case. However, instead of the holder member 151A, there may be provided a holder member that does not have a configuration corresponding to the winding pairs U2, V2, and W2. For example, the hooks FU, FV, and FW may be omitted. In addition, the terminal holder 151, i.e., the groove-shaped guides (corresponding to the guides 52) and the claws 153, may have a shape corresponding only to the winding pairs U1, V1, and W1, or the terminal 160 may have a shape (e.g., the number of slits) corresponding only to the winding pairs U1, V1, and W1.

While preferred embodiments of the invention have been described and illustrated, it is to be understood that the invention is not limited to the embodiments disclosed herein. Various changes, modifications, and alterations may be made within the scope of the invention as defined in the appended claims. Furthermore, the elements or components described in the above embodiments may be variously combined or integrated.

The following are additional notes regarding the above embodiments.

Additional Note 1

A brushless motor, comprising:
a motor body (M);
a bracket (30, 230) to which the motor body is attached; and
a power supply structure (40, 50, 150, 240, 250) configured to supply power to the motor body through a through hole (31, 231) formed in the bracket, wherein
the bracket is arranged to cover an axial end face of the motor body,
the motor body includes a stator (10, 210),
the stator includes a stator core (13) having a plurality of teeth (13A), and a stator coil (11) formed of a winding (12) wound around the teeth,
with respect to each phase, the power supply structure includes:
a winding pair (U1, U2, V1, V2, W1, W2) including a first lead portion (U1a, U2a, V1a, V2a, W1a, W2a) of the winding and a second lead portion (U1b, U2b, V1b, V2b, W1b, W2b) of the winding;
a guide part (40, 240) that guides the winding pair; and
a connector part (50U, 50V, 50W, 150U, 150V, 150W, 250U, 250V, 250W) to which the first lead portion and the second lead portion are electrically connected;
the winding pair includes:
a first portion guided by the guide part; and
a second portion formed by bending the winding pair at an axially outer end of the first portion in a direction along a surface of the bracket,
the first portion passes through the through hole in an axial direction, and
the second portion extends to the connector part.

In the configuration according to additional note 1, the winding pair passes through the through hole in the axial direction at the first portion guided by the guide part and is bent in a direction along the surface of the bracket, whereby the first lead portion and the second lead portion are connected and conduct to the connector part. In this manner, the guide part is provided for each winding pair to connect each winding pair to the connector part. This streamlines the assembly work and simplifies the configuration required for the connection.

Additional Note 2

The brushless motor as set forth in additional note 1, wherein
with respect to each phase, the power supply structure includes:
the winding pair comprising a plurality of winding pairs; and
the guide part comprising a plurality of guide parts, and
first lead portions and second lead portions of the winding pairs are electrically connected to the same connector part.

In the configuration according to additional note 2, the first lead portions and the second lead portions of the winding pairs are electrically connected to the same connector part, and therefore connector parts can be integrated for each phase. This results in a reduction in the number of connector parts, thereby facilitating the assembly work.

Additional Note 3

The brushless motor as set forth in additional note 1 or 2, wherein the second portion of the winding pair for one phase does not cross the second portion of the winding pair for another phase as viewed in the axial direction.

In the configuration according to additional note 3, windings for different phases can be prevented from conducting to each other.

Additional Note 4

The brushless motor as set forth in any one of additional notes 1 to 3, wherein the second portion has a length that is the same in the first lead portion and the second lead portion and that varies depending on the winding pair.

In the configuration according to additional note 4, the second portions of each winding pair can be arranged linearly.

Additional Note 5

The brushless motor as set forth in additional note 4, wherein the length of the second portion corresponds to a distance from the guide part corresponding to the winding pair to the connector part.

In the configuration according to additional note 5, the second portions of each winding pair can be arranged linearly.

Additional Note 6

The brushless motor as set forth in additional note 2, wherein
 the brushless motor is a three-phase motor,
 the through hole formed in the bracket comprises a plurality of through holes corresponding to respective phases,
 the power supply structure includes:
  the guide parts each corresponding to one of the through holes, and
  three connector parts each being the connector part corresponding to one of three phases, and
 the winding pairs for each phase are connected to one of the connector parts for the phase.

In the configuration according to additional note 6, the winding pairs are passed through their respective through holes and can be collectively connected to the three connector parts.

Additional Note 7

The brushless motor as set forth in any one of additional notes 1 to 6, wherein connector parts, each being the connector part for each phase, are arranged linearly in a position offset from an axial center.

In the configuration according to additional note 7, a plurality of connector parts are arranged linearly in a position offset from the axial center. Thus, a space can be secured near the axial center.

Additional Note 8

The brushless motor as set forth in additional note 1, wherein the connector part includes:
 a terminal having a slit to which the first lead portion and the second lead portion are press-fitted; and
 an insulating terminal holder that holds the terminal.

In the configuration according to additional note 8, the terminal has a slit to which the first lead portion and the second lead portion are press-fitted. As a result, the first lead portion and the second lead portion can be connected to the terminal without using fusing, projection welding, or the like.

Additional Note 9

The brushless motor as set forth in additional note 8, wherein the terminal holder has groove-shaped guides that guide the first lead portion and the second lead portion.

In the configuration according to additional note 9, the first lead portion and the second lead portion are guided by the guides, and they can thereby be stably press-fitted to the slit.

Additional Note 10

The brushless motor as set forth in additional note 8 or 9, wherein the terminal holder is attached to the surface of the bracket.

In the configuration according to additional note 10, the terminal holder isolates the terminal from the bracket.

Additional Note 11

The brushless motor as set forth in any one of additional notes 8 to 10, wherein
 the terminal is provided for each phase, and
 terminal holders, each being the terminal holder for each phase, are formed of a common holder member (TH, 51A, 151A).

In the configuration according to additional note 11, the terminal folders can be formed of a single member.

Additional Note 12

A method for manufacturing a brushless motor that includes: a motor body; a bracket to which the motor body is attached; and a power supply structure configured to supply power to the motor body through a through hole formed in the bracket, wherein the bracket is arranged to cover an axial end face of the motor body, the motor body includes a stator, and the stator includes a stator core having a plurality of teeth and a stator coil formed of a winding wound around the teeth, the method comprising:
 feeding a winding pair for each phase through the through hole in an axial direction, wherein the winding pair includes a first lead portion of the winding and a second lead portion of the winding; and
 bending the winding pair passing through the through hole in a direction along a surface of the bracket to electrically connect the first lead portion and the second lead portion to a connector part.

In the configuration according to additional note 12, windings are connected to the connector part in pairs. Thus, the first lead portion and the second lead portion can be connected to the connector part with a simple assembly process.

Additional Note 13

The method as set forth in additional note 12, further comprising cutting the winding pair being electrically connected to the connector part to separate the winding pair into the first lead portion and the second lead portion.

In the configuration according to additional note 12, the winding pair is cut while being electrically connected to the connector part and separated into the first lead portion and the second lead portion. As a result, the weight and size of the brushless motor can be reduced.

LIST OF REFERENCE SIGNS

11 Coil
12 Winding
30, 230 Bracket
31, 231 Through hole
40, 240 Guide part
50, 50U, 50V, 50W Connector part
150, 150U, 150V, 150W Connector part
250, 250U, 250V, 250W Connector part
U1, U2, V1, V2, W1, W2 Winding pair
U1a, U2a, V1a, V2a, W1a, W2a Lead portion
U1b, U2b, V1b, V2b, W1b, W2b Lead portion

The invention claimed is:

1. A brushless motor, comprising:
a motor body;
a bracket to which the motor body is attached; and
a power supply structure configured to supply power to the motor body through a through hole formed in the bracket, wherein
the bracket is arranged to cover an axial end face of the motor body,
the motor body includes a stator,
the stator includes a stator core having a plurality of teeth, and a stator coil formed of a winding wound around the teeth,
with respect to each phase, the power supply structure includes:
 a winding pair including a first lead portion of the winding and a second lead portion of the winding;
 a guide part that guides the winding pair; and
 a connector part to which the first lead portion and the second lead portion are electrically connected;
the winding pair includes:
 a first portion guided by the guide part; and
 a second portion formed by bending the winding pair at an axially outer end of the first portion in a direction along a surface of the bracket,
the first portion passes through the through hole in an axial direction, and
the second portion extends to the connector part.

2. The brushless motor according to claim 1, wherein with respect to each phase, the power supply structure includes:
the winding pair comprising a plurality of winding pairs; and
the guide part comprising a plurality of guide parts, and
first lead portions and second lead portions of the winding pairs are electrically connected to the same connector part.

3. The brushless motor according to claim 1, wherein the second portion of the winding pair for one phase does not cross the second portion of the winding pair for another phase as viewed in the axial direction.

4. The brushless motor according to claim 1, wherein the second portion has a length that is the same in the first lead portion and the second lead portion and that varies depending on the winding pair.

5. The brushless motor according to claim 4, wherein the length of the second portion corresponds to a distance from the guide part corresponding to the winding pair to the connector part.

6. The brushless motor according to claim 2, wherein
the brushless motor is a three-phase motor,
the through hole formed in the bracket comprises a plurality of through holes corresponding to respective phases,
the power supply structure includes:
 the guide parts each corresponding to one of the through holes, and
 three connector parts each being the connector part corresponding to one of three phases, and
the winding pairs for each phase are connected to one of the connector parts for the phase.

7. The brushless motor according to claim 1, wherein connector parts, each being the connector part for each phase, are arranged linearly in a position offset from an axial center.

8. The brushless motor according to claim 1, wherein the connector part includes:
a terminal having a slit to which the first lead portion and the second lead portion are press-fitted; and
an insulating terminal holder that holds the terminal.

9. The brushless motor according to claim 8, wherein the terminal holder has groove-shaped guides that guide the first lead portion and the second lead portion.

10. The brushless motor according to claim 8, wherein the terminal holder is attached to the surface of the bracket.

11. The brushless motor according to claim 8, wherein
the terminal is provided for each phase, and
terminal holders, each being the terminal holder for each phase, are formed of a common holder member.

12. A method for manufacturing a brushless motor that includes: a motor body; a bracket to which the motor body is attached; and a power supply structure configured to supply power to the motor body through a through hole formed in the bracket, wherein the bracket is arranged to cover an axial end face of the motor body, the motor body includes a stator, and the stator includes a stator core having a plurality of teeth and a stator coil formed of a winding wound around the teeth, the method comprising:
feeding a winding pair for each phase through the through hole in an axial direction, wherein the winding pair includes a first lead portion of the winding and a second lead portion of the winding; and
bending the winding pair passing through the through hole in a direction along a surface of the bracket to electrically connect the first lead portion and the second lead portion to a connector part.

13. The method according to claim 12, further comprising cutting the winding pair being electrically connected to the connector part to separate the winding pair into the first lead portion and the second lead portion.

* * * * *